US012812167B2

(12) United States Patent
Chiang et al.

(10) Patent No.: US 12,812,167 B2
(45) Date of Patent: Nov. 24, 2026

(54) METHOD AND APPARATUS FOR IMPLICIT CROSS-COMPONENT PREDICTION IN VIDEO CODING SYSTEM

(71) Applicant: MEDIATEK INC., Hsinchu City (TW)

(72) Inventors: Man-Shu Chiang, Hsinchu City (TW); Chih-Wei Hsu, Hsinchu City (TW); Ching-Yeh Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/854,793

(22) PCT Filed: Apr. 13, 2023

(86) PCT No.: PCT/CN2023/088010

§ 371 (c)(1),
(2) Date: Oct. 7, 2024

(87) PCT Pub. No.: WO2023/198142

PCT Pub. Date: Oct. 19, 2023

(65) Prior Publication Data

US 2025/0234035 A1 Jul. 17, 2025

Related U.S. Application Data

(60) Provisional application No. 63/330,827, filed on Apr. 14, 2022.

(51) Int. Cl.
*H04N 19/593* (2014.01)
*H04N 19/147* (2014.01)
(Continued)

(52) U.S. Cl.
CPC ......... *H04N 19/593* (2014.11); *H04N 19/147* (2014.11); *H04N 19/176* (2014.11); *H04N 19/186* (2014.11); *H04N 19/70* (2014.11)

(58) Field of Classification Search
CPC .... H04N 19/105; H04N 19/11; H04N 19/147; H04N 19/176; H04N 19/186; H04N 19/593; H04N 19/70
See application file for complete search history.

(56) References Cited

U.S. PATENT DOCUMENTS 11,025,903 B2 6/2021 Zhang
12,052,428 B2 7/2024 Zhang
(Continued)

FOREIGN PATENT DOCUMENTS

CN 110100436 A 8/2019
CN 110771164 A 2/2020
(Continued)

OTHER PUBLICATIONS

"Enhanced Cross-Component Linear Model for Chroma Intra-Prediction in Video Coding"—Zhang et al., IEEE Transactions on Image Processing, vol. 27, No. 8, Aug. 2018. (Year: 2018).*
(Continued)

*Primary Examiner* — Mainul Hasan
(74) *Attorney, Agent, or Firm* — McClure, Qualey & Rodack, LLP

(57) ABSTRACT

A method and apparatus for video coding are disclosed. According to this method, a first predictor including predicted samples of the current block is determined for the second-colour block. At least one second predictor is determined for the second-colour block based on the first-colour block, where one or more target model parameters associated with at least one target prediction model corresponding to said at least one second predictor are derived implicitly by using neighbouring samples of the second colour block and/or neighbouring samples of the first-colour block, and where said at least one second predictor corresponds to all or one subset of predicted samples of the current block. A final predictor is generated by blending the first predictor
(Continued)

and said at least one second predictor. The input data associated with the second-colour block is encoded or decoded using prediction data including the final predictor.

23 Claims, 13 Drawing Sheets

(51) Int. Cl.
*H04N 19/176* (2014.01)
*H04N 19/186* (2014.01)
*H04N 19/70* (2014.01)

(56) References Cited

U.S. PATENT DOCUMENTS

| | | | | |
|---|---|---|---|---|
| 2018/0077426 | A1* | 3/2018 | Zhang | H04N 19/157 |
| 2019/0068977 | A1* | 2/2019 | Zhang | H04N 19/176 |
| 2020/0154126 | A1 | 5/2020 | Li | |
| 2021/0227229 | A1 | 7/2021 | Ma | |
| 2021/0258572 | A1 | 8/2021 | Zhang | |
| 2021/0392364 | A1 | 12/2021 | Chiang | |
| 2024/0040133 | A1* | 2/2024 | Jhu | H04N 19/105 |
| 2024/0155134 | A1* | 5/2024 | Jeon | H04N 19/159 |
| 2024/0388731 | A1* | 11/2024 | Deng | H04N 19/132 |

FOREIGN PATENT DOCUMENTS

| | | | | |
|---|---|---|---|---|
| CN | 114830658 | A * | 7/2022 | H04N 19/61 |
| WO | 2021045654 | A2 | 3/2021 | |
| WO | 2023131208 | A1 | 7/2023 | |

OTHER PUBLICATIONS

"Joint Cross-Component Linear Model for Chroma Intra Prediction"—Ghaznavi-Youvalari et al., 978-1-7281-9320-5/20/$31.00 Â© 2020 IEEE. (Year: 2020).*

International Search Report and Written Opinion dated Jul. 3, 2023, issued in application No. PCT/CN2023/088010.

Rath, G., et al.; "Non-CE3: directional intra prediction with varying angle;" Joint Video Experts Team (JVET) of ITU-T SG 16 WP 3 and ISO/IEC JTC 1/SC 29/WG 11; Mar. 2019; pp. 1-3.

Chen, J., et al.; "CE2-1.4: luma-chroma dependency reduction for chroma scaling;" Joint Video Experts Team (JVET) of ITU-T SG 16 WP 3 and ISO/IEC JTC 1/SC 29/WG 11; Jul. 2019; pp. 1-7.

Chinese language office action dated Nov. 16, 2023, issued in application No. TW 112113988.

Lie, W.N., et al.; "Video Error Concealment by Integrating Greedy Suboptimization and Kalman Filtering Techniques;" IEEE Transactions on Circuits and Systems for Video Technology; vol. 16; No. 8; Aug. 2006; pp. 982-992.

Extended European Search Report dated Jan. 29, 2026, issued in application No. EP 23787784.0.

Li, X., et al.; "EE2-1.2: On chroma intra prediction;" Joint Video Experts Team (JVET) of ITU-T SG 16 WP 3 and ISO/IEC JTC 1/SC 20; Apr. 2022; pp. 1-6.

Coban, M., et al.; "Algorithm description of Enhanced Compression Model 3 (ECM 3);" Joint Video Experts Team (JVET) of ITU-T SG 16 WP 3 and ISO/IEC JTC 1/SC 20; Jul. 2021; pp. 1-28.

* cited by examiner

METHOD AND APPARATUS FOR IMPLICIT CROSS-COMPONENT PREDICTION IN VIDEO CODING SYSTEM

CROSS REFERENCE TO RELATED APPLICATIONS

The present invention is a non-Provisional Application of and claims priority to U.S. Provisional Patent Application No. 63/330,827 filed on Apr. 14, 2022. The U.S. Provisional Patent Application is hereby incorporated by reference in its entirety.

FIELD OF THE INVENTION

The present invention relates to video coding system. In particular, the present invention relates to blending predictors for cross-colour prediction to improve coding efficiency.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology-Coded representation of immersive media-Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

BRIEF SUMMARY OF THE INVENTION

A method and apparatus for video coding are disclosed. According to this method, input data associated with a first-colour block and a current block comprising a second-colour block are received, wherein the input data comprise pixel data for the first-colour block and the current block to be encoded at an encoder side or coded data associated with the first-colour block and the current block to be decoded at a decoder side are received. A first predictor for the second-colour block is determined, where the first predictor corresponds to all or one subset of predicted samples of the current block. At least one second predictor is determined for the second-colour block based on the first-colour block, where one or more target model parameters associated with at least one target prediction model corresponding to said at least one second predictor are derived implicitly by using one or more neighbouring samples of the second colour block and/or one or more neighbouring samples of the first-colour block, and where said at least one second predictor corresponds to all or one subset of predicted samples of the current block. A final predictor is generated, where the final predictor comprises one portion of the first predictor and one portion of said at least one second predictor. The input data associated with the second-colour block is encoded or decoded using prediction data comprising the final predictor.

In one embodiment, the first predictor corresponds to an intra predictor. In another embodiment, the first predictor corresponds to a type of cross-colour predictor. For example, the first predictor may be generated based on CCLM_LT, CCLM_L, or CCLM_T.

In one embodiment, said at least one second predictor is generated based on MMLM (Multiple Model CCLM (Cross Component Linear Model)) mode.

In one embodiment, said one portion of the first predictor is derived based on the first predictor with a first weight and said one portion of said at least one second predictor is derived based on said at least one second predictor with at least one second weight. The final predictor is derived as a sum of said one portion of the first predictor and said one portion of said at least one second predictor. The first weight, said at least one second weight, or both can be determined for individual samples of the second-colour block.

In one embodiment, a syntax is signalled at the encoder side to indicate whether to allow said determining said at least one second predictor, said generating the final predictor, and said encoding or decoding the current block using the prediction data comprising the final predictor. Furthermore, the syntax can be signalled at the encoder side or parsed at the decoder side in a block level, tile level, slice level, picture level, SPS (Sequence Parameter Set) level, or PPS (Picture Parameter Set) level. In one embodiment, the syntax indicates to allow said determining said at least one second predictor, said generating the final predictor, and said encoding or decoding the current block using the prediction data comprising the final predictor if the current block uses a pre-defined cross-colour mode. An example of the pre-defined cross-colour mode refers to an LM (Linear Model) mode. The LM mode may correspond to CCLM_LT mode, CCLM_L mode, or CCLM_T mode.

In one embodiment, whether to allow said determining said at least one second predictor, said generating the final predictor, and said encoding or decoding the current block using the prediction data comprising the final predictor is determined implicitly.

In one embodiment, one or more model parameters are determined for each prediction model of a candidate set and a cost is evaluated for said each prediction model of the candidate set, and wherein one prediction model of the candidate set achieving a minimum cost is selected as said at least one target prediction model and said one or more model parameters associated with said one prediction model of the candidate set achieving the minimum cost are selected as said one or more target model parameters.

In one embodiment, said determining said at least one second predictor, said generating the final predictor, and said encoding or decoding the current block using the prediction data comprising the final predictor are allowed if the minimum cost is below a threshold.

In one embodiment, a second-colour template comprising selected neighbouring samples of the second-colour block and a first-colour template comprising corresponding neighbouring samples of the first-colour block are determined, said one or more model parameters are determined for said each prediction model of the candidate set based on reference samples of the first-colour template and reference samples of the second-colour template, and wherein the cost for said each prediction model of the candidate set is determined between reconstructed samples and predicted samples of the second-colour template, and the predicted samples of the second-colour template are derived by applying said one or more model parameters determined for said each prediction model to the first-colour template. In one embodiment, the second-colour template comprises top neighbouring samples of the second-colour block, left neighbouring samples of the second-colour block, or both of the second-colour block, and the first-colour template comprises top neighbouring samples, left neighbouring samples, or both of the first-colour block. In one embodiment, the current block comprises a Cr block and a Cb block, and the first-colour block corresponds to a Y block and the second-colour block corresponds to the Cr block or the Cb block, and wherein when a syntax indicates that said determining said at least one second predictor, said generating the final predictor, and said encoding or decoding the current block using the prediction data comprising the final predictor are allowed for one of the Cr block and the Cb block, then said determining said at least one second predictor, said generating the final predictor, and said encoding or decoding the current block using the prediction data comprising the final predictor are also allowed for the other of the Cr block and the Cb block.

In one embodiment, the cost for said each prediction model of the candidate set corresponds to a boundary matching cost measuring discontinuity between predicted samples of the second-colour block and neighbouring reconstructed samples of the second-colour block, and wherein the predicted samples of the second-colour block are derived based on the first-colour block using said one or more model parameters determined for said each prediction model. In one embodiment, the boundary matching cost comprises a top boundary matching cost comparing between top predicted samples of the second-colour block and neighboring top reconstructed samples of the second-colour block, a left boundary matching cost comparing between left predicted samples of the second-colour block and neighboring left reconstructed samples of the second-colour block, or both.

In one embodiment, a second-colour template comprising selected neighbouring samples of the second-colour block and a first-colour template comprising corresponding neighbouring samples of the first-colour block are determined, said one or more model parameters are determined for said each prediction model of the candidate set based on the second-colour template and the first-colour template, and wherein the cost for said each prediction model of the candidate set is determined between reconstructed samples and predicted samples of the second-colour template, and the predicted samples of the second-colour template are derived by applying said one or more model parameters determined for said each prediction model to the first-colour template.

DETAILED DESCRIPTION OF THE INVENTION

Figure 1A:
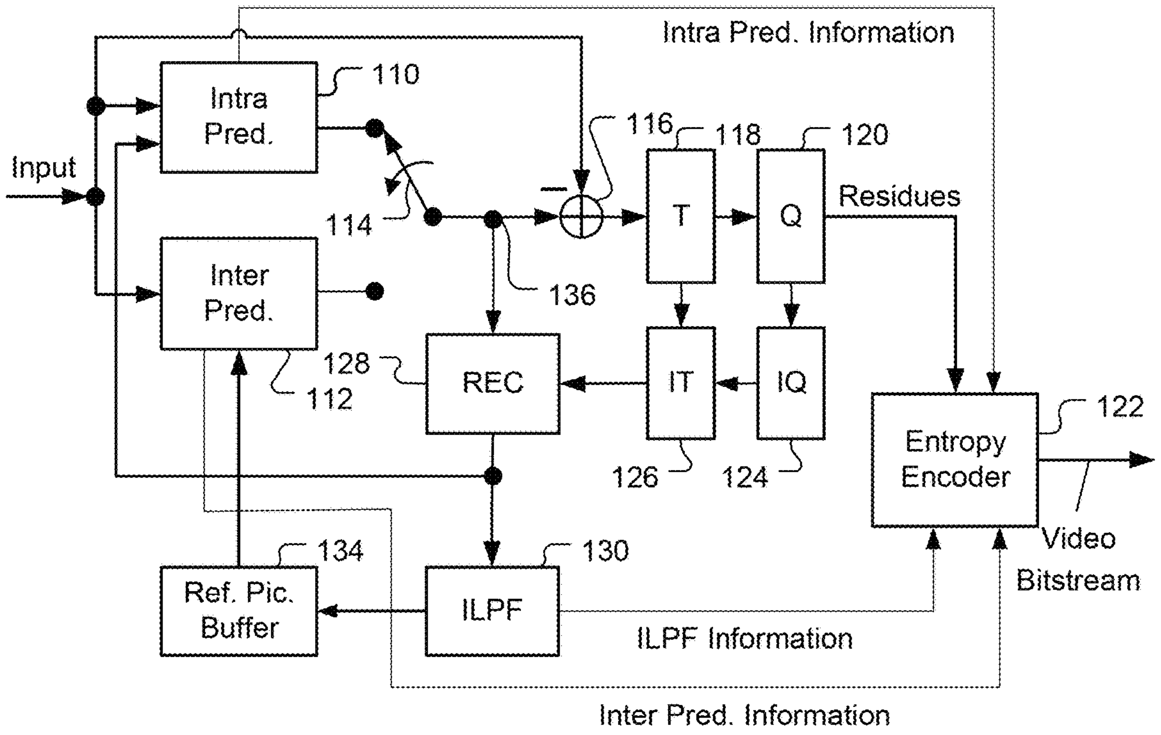
Fig. 1A (Prior Art)
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

The VVC standard incorporates various new coding tools to further improve the coding efficiency over the HEVC standard. Among various new coding tools, some coding tools relevant to the present invention are reviewed as follows.

Inter Prediction Overview

According to JVET-T2002 Section 3.4. (Jianle Chen, et. al., "Algorithm description for Versatile Video Coding and Test Model 11 (VTM 11)", Joint Video Experts Team (JVET) of ITU-T SG 16 WP 3 and ISO/IEC JTC 1/SC 29, 20th Meeting, by teleconference, 7-16 Oct. 2020, Document: JVET-T2002)), for each inter-predicted CU, motion parameters consist of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU, which are obtained from neighbouring CUs, including spatial and temporal candidates, and additional schedules introduced in VVC. The merge mode can be applied to any inter-predicted CU, not only for skip mode. The alternative to the merge mode is the explicit transmission of motion parameters, where motion vector, corresponding reference picture index for each reference picture list and reference picture list usage flag and other needed information are signalled explicitly per each CU.

Beyond the inter coding features in HEVC, VVC includes a number of new and refined inter prediction coding tools listed as follows:

Extended merge prediction
Merge mode with MVD (MMVD)
Symmetric MVD (SMVD) signalling
Affine motion compensated prediction
Subblock-based temporal motion vector prediction (SbTMVP)
Adaptive motion vector resolution (AMVR)
Motion field storage: 1/16th luma sample MV storage and 8×8 motion field compression
Bi-prediction with CU-level weight (BCW)
Bi-directional optical flow (BDOF)
Decoder side motion vector refinement (DMVR)
Geometric partitioning mode (GPM)
Combined inter and intra prediction (CIIP)

The following description provides the details of those inter prediction methods specified in VVC.

Extended Merge Prediction

In VVC, the merge candidate list is constructed by including the following five types of candidates in order:

1) Spatial MVP from spatial neighbour CUs
2) Temporal MVP from collocated CUs
3) History-based MVP from an FIFO table
4) Pairwise average MVP
5) Zero MVs.

The size of merge list is signalled in sequence parameter set (SPS) header and the maximum allowed size of merge list is 6. For each CU coded in the merge mode, an index of best merge candidate is encoded using truncated unary binarization (TU). The first bin of the merge index is coded with context and bypass coding is used for remaining bins.

The derivation process of each category of the merge candidates is provided in this session. As done in HEVC, VVC also supports parallel derivation of the merge candidate lists (or called as merging candidate lists) for all CUs within a certain size of area.

Spatial Candidate Derivation

Figure 2:
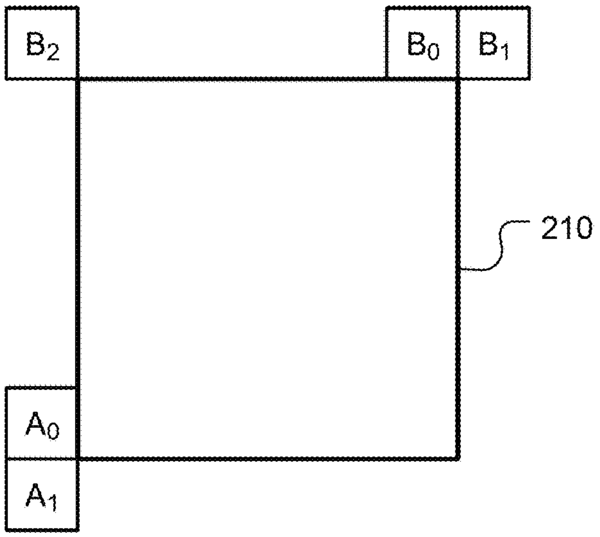
FIG. 2 illustrates the neighbouring blocks used for deriving spatial merge candidates for VVC.
Figure 3:
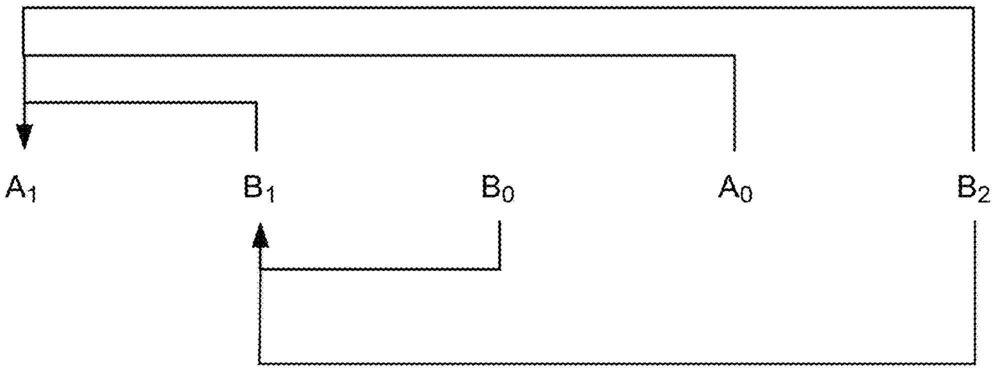
FIG. 3 illustrates the possible candidate pairs considered for redundancy check in VVC.

The derivation of spatial merge candidates in VVC is the same as that in HEVC except that the positions of first two merge candidates are swapped. A maximum of four merge candidates ($B_0$, $A_0$, $B_1$ and $A_1$) for current CU 210 are selected among candidates located in the positions depicted in FIG. 2. The order of derivation is $B_0$, $A_0$, $B_1$, $A_1$ and $B_2$. Position $B_2$ is considered only when one or more neighbouring CU of positions $B_0$, $A_0$, $B_1$, $A_1$ are not available (e.g. belonging to another slice or tile) or is intra coded. After candidate at position $A_1$ is added, the addition of the remaining candidates is subject to a redundancy check which ensures that candidates with the same motion information are excluded from the list so that coding efficiency is improved. To reduce computational complexity, not all possible candidate pairs are considered in the mentioned redundancy check. Instead, only the pairs linked with an arrow in FIG. 3 are considered and a candidate is only added to the list if the corresponding candidate used for redundancy check does not have the same motion information.

Temporal Candidates Derivation

Figure 4:
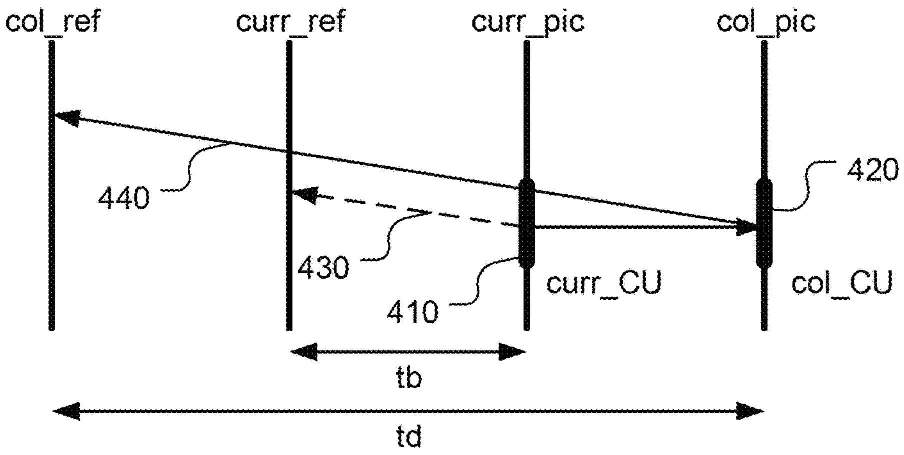
FIG. 4 illustrates an example of temporal candidate derivation, where a scaled motion vector is derived according to POC (Picture Order Count) distances.

In this step, only one candidate is added to the list. Particularly, in the derivation of this temporal merge candidate for a current CU 410, a scaled motion vector is derived based on the co-located CU 420 belonging to the collocated reference picture as shown in FIG. 4. The reference picture list and the reference index to be used for the derivation of the co-located CU is explicitly signalled in the slice header. The scaled motion vector 430 for the temporal merge candidate is obtained as illustrated by the dotted line in FIG. 44, which is scaled from the motion vector 440 of the co-located CU using the POC (Picture Order Count) distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 5:
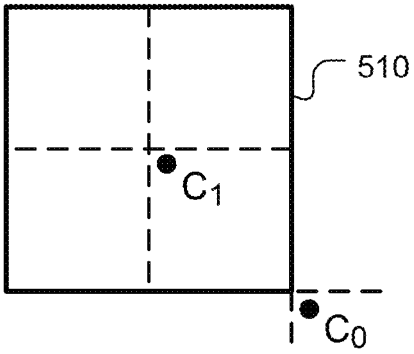
FIG. 5 illustrates the position for the temporal candidate selected between candidates $C_0$ and $C_1$.

The position for the temporal candidate is selected between candidates $C_0$ and $C_1$, as depicted in FIG. 5. If CU at position $C_0$ is not available, is intra coded, or is outside of the current row of CTUs, position $C_1$ is used. Otherwise, position $C_0$ is used in the derivation of the temporal merge candidate.

History-Based Merge Candidates Derivation

The history-based MVP (HMVP) merge candidates are added to the merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 5 History-based MVP (HMVP) candidates may be added to the table. When inserting a new motion candidate to the table, a constrained first-in-first-out (FIFO) rule is utilized where redundancy check is firstly applied to find whether there is an identical HMVP in the table. If found, the identical HMVP is removed from the table and all the HMVP candidates afterwards are moved forward, and the identical HMVP is inserted to the last entry of the table.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy, check operations, the following simplifications are introduced:

1. The last two entries in the table are checked for redundancy with respect to $A_1$ and $B_1$ spatial candidates, respectively.
2. Once the total number of available merge candidates reaches the maximally allowed merge candidates minus 1, the merge candidate list construction process from HMVP is terminated.

Pair-Wise Average Merge Candidates Derivation

Pairwise average candidates are generated by averaging predefined pairs of candidates in the existing merge candidate list, using the first two merge candidates. The first merge candidate is defined as p0Cand and the second merge candidate can be defined as p1Cand, respectively. The averaged motion vectors are calculated according to the availability of the motion vector of p0Cand and p1Cand separately for each reference list. If both motion vectors are available in one list, these two motion vectors are averaged even when they point to different reference pictures, and its reference picture is set to the one of p0Cand; if only one motion vector is available, use the one directly; and if no motion vector is available, keep this list invalid. Also, if the half-pel interpolation filter indices of p0Cand and p1Cand are different, it is set to 0.

When the merge list is not full after pair-wise average merge candidates are added, the zero MVPs are inserted in the end until the maximum merge candidate number is encountered.

Merge Estimation Region

Merge estimation region (MER) allows independent derivation of merge candidate list for the CUs in the same merge estimation region (MER). A candidate block that is within the same MER as the current CU is not included for the generation of the merge candidate list of the current CU. In addition, the updating process for the history-based motion vector predictor candidate list is updated only if (xCb+cbWidth)>>Log 2ParMrgLevel is greater than xCb>>Log 2ParMrgLevel and (yCb+cbHeight)>>Log 2ParMrgLevel is great than (yCb>>Log 2ParMrgLevel), and where (xCb, yCb) is the top-left luma sample position of the current CU in the picture and (cbWidth, cbHeight) is the CU size. The MER size is selected at the encoder side and signalled as log 2_parallel_merge_level_minus2 in the Sequence Parameter Set (SPS).

Merge Mode with MVD (MMVD)

In addition to the merge mode, where the implicitly derived motion information is directly used for prediction samples generation of the current CU, the merge mode with motion vector differences (MMVD) is introduced in VVC. A MMVD flag is signalled right after sending a regular merge flag to specify whether MMVD mode is used for a CU.

In MMVD, after a merge candidate is selected (referred as a base merge candidate in this disclosure), it is further refined by the signalled MVDs information. The further information includes a merge candidate flag, an index to specify motion magnitude, and an index for indication of motion direction. In MMVD mode, one for the first two candidates in the merge list is selected to be used as MV basis. The MMVD candidate flag is signalled to specify which one is used between the first and second merge candidates.

Figure 6:
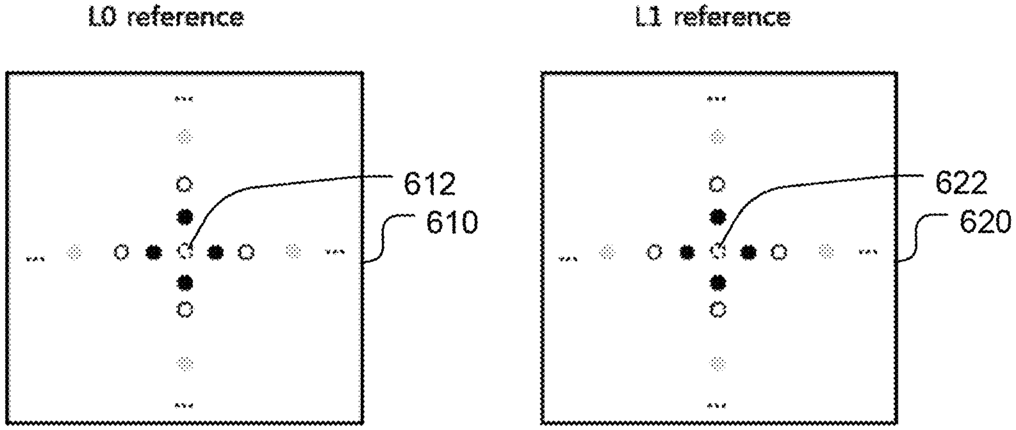
FIG. 6 illustrates the distance offsets from a starting MV in the horizontal and vertical directions according to Merge Mode with MVD (MMVD).

Distance index specifies motion magnitude information and indicates the pre-defined offset from the starting points (612 and 622) for a L0 reference block 610 and L1 reference block 620. As shown in FIG. 6, an offset is added to either horizontal component or vertical component of the starting MV, where small circles in different styles correspond to different offsets from the centre. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index represents the direction of the MVD relative to the starting point. The direction index can represent the four directions as shown in Table 2. It is noted that the meaning of MVD sign could be variant according to the information of starting MVs. When the starting MVs are an un-prediction MV or bi-prediction MVs with both lists pointing to the same side of the current picture (i.e. POCs of two references both larger than the POC of the current picture, or both smaller than the POC of the current picture), the sign in Table 2 specifies the sign of the MV offset added to the starting MV. When the starting MVs are bi-prediction MVs with the two MVs pointing to the different sides of the current picture (i.e. the POC of one reference larger than the POC of the current picture, and the POC of the other reference smaller than the POC of the current picture), and the difference of POC in list 0 is greater than the one in list 1, the sign in Table 2 specifies the sign of MV offset added to the list0 MV component of the starting MV and the sign for the list1 MV has an opposite value. Otherwise, if the difference of POC in list 1 is greater than list 0, the sign in Table 2 specifies the sign of the MV offset added to the list1 MV component of starting MV and the sign for the list0 MV has an opposite value.

The MVD is scaled according to the difference of POCs in each direction. If the differences of POCs in both lists are the same, no scaling is needed. Otherwise, if the difference of POC in list 0 is larger than the one in list 1, the MVD for list 1 is scaled, by defining the POC difference of L0 as td and POC difference of L1 as tb, described in FIG. 5. If the POC difference of L1 is greater than L0, the MVD for list 0 is scaled in the same way. If the starting MV is uni-predicted, the MVD is added to the available MV.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

Affine Motion Compensated Prediction

Figure 7A:
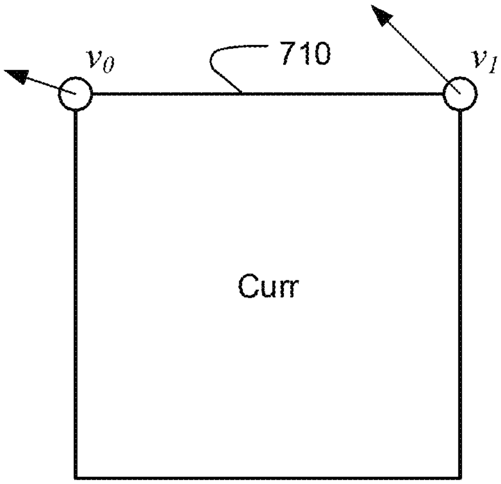
FIG. 7A illustrates an example of the affine motion field of a block described by motion information of two control point (4-parameter).
Figure 7B:
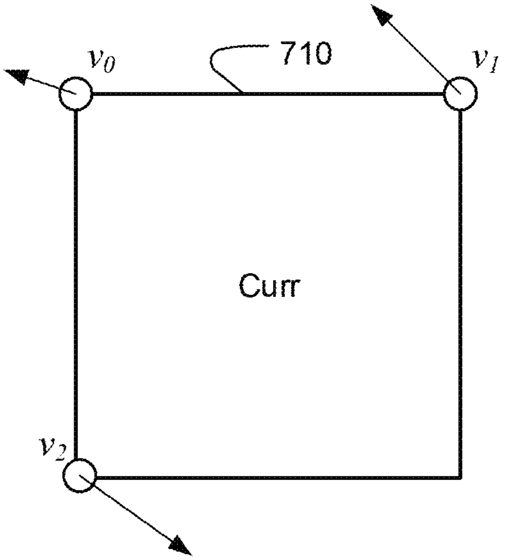
FIG. 7B illustrates an example of the affine motion field of a block described by motion information of three control point motion vectors (6-parameter).

In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. As shown FIGS. 7A-B, the affine motion field of the block 710 is described by motion information of two control point (4-parameter) in FIG. 7A or three control point motion vectors (6-parameter) in FIG. 7B.

For 4-parameter affine motion model, motion vector at sample location (x, y) in a block is derived as:

$$\begin{cases} mv_x = \frac{mv_{1x} - mv_{0x}}{W}x + \frac{mv_{1y} - mv_{0y}}{H}y + mv_{0x} \\ mv_y = \frac{mv_{1y} - mv_{0y}}{W}x + \frac{mv_{1y} - mv_{0x}}{H}y + mv_{0y} \end{cases} \quad (1)$$

For 6-parameter affine motion model, motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad (2)$$

Where ($mv_{0x}$, $mv_{0y}$) is motion vector of the top-left corner control point, ($mv_{1x}$, $mv_{1y}$) is motion vector of the top-right corner control point, and ($mv_{2x}$, $mv_{2y}$) is motion vector of the bottom-left corner control point.

Figure 8:
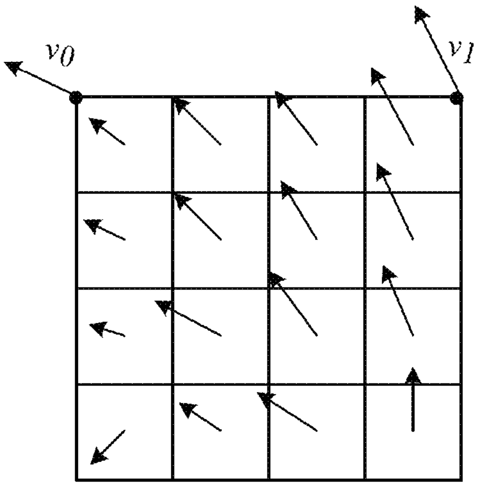
FIG. 8 illustrates an example of block based affine transform prediction, where the motion vector of each 4×4 luma subblock is derived from the control-point MVs.

In order to simplify the motion compensation prediction, block based affine transform prediction is applied. To derive motion vector of each 4×4 luma subblock, the motion vector of the centre sample of each subblock, as shown in FIG. 8, is calculated according to above equations, and rounded to 1/16 fraction accuracy. Then, the motion compensation interpolation filters are applied to generate the prediction of each subblock with the derived motion vector. The subblock size of chroma-components is also set to be 4×4. The MV of a 4×4 chroma subblock is calculated as the average of the MVs of the top-left and bottom-right luma subblocks in the collocated 8×8 luma region.

As is for translational-motion inter prediction, there are also two affine motion inter prediction modes: affine merge mode and affine AMVP mode.

Affine Merge Prediction

Figure 9:
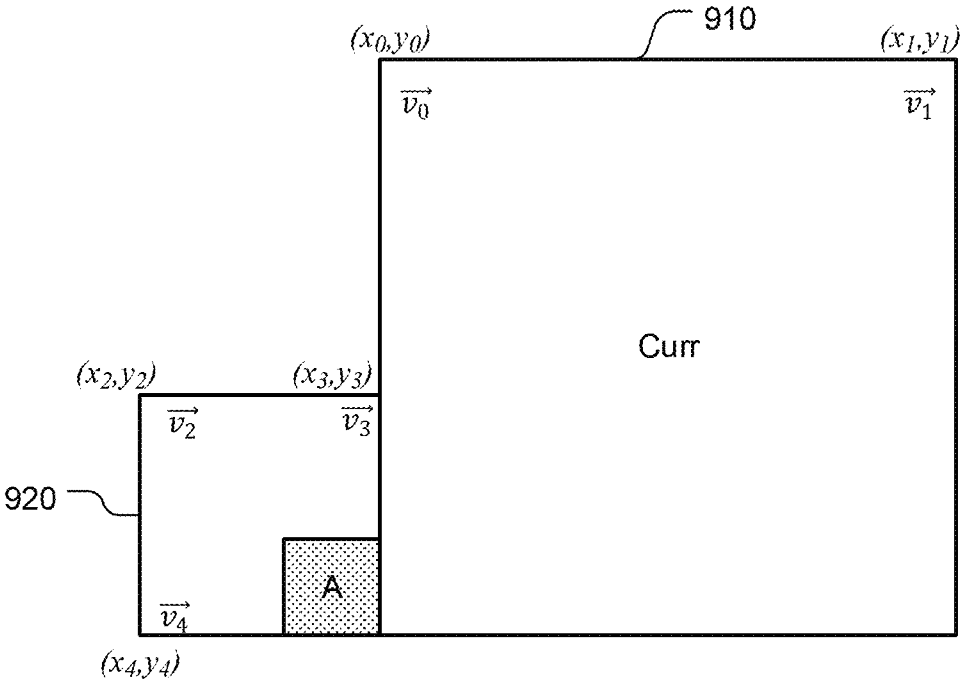
FIG. 9 illustrates an example of derivation for inherited affine candidates based on control-point MVs of a neighbouring block.

AF_MERGE mode can be applied for CUs with both width and height larger than or equal to 8. In this mode, the CPMVs (Control Point MVs) of the current CU is generated based on the motion information of the spatial neighbouring CUs. There can be up to five CPMVP (CPMV Prediction) candidates and an index is signalled to indicate the one to be used for the current CU. The following three types of CPVM candidate are used to form the affine merge candidate list:

- Inherited affine merge candidates that are extrapolated from the CPMVs of the neighbour CUs
- Constructed affine merge candidates CPMVPs that are derived using the translational MVs of the neighbour CUs
- Zero MVs In VVC, there are two inherited affine candidates at most, which are derived from the affine motion model of the neighbouring blocks, one from left neighbouring CUs and one from above neighbouring CUs. The candidate blocks are the same as those shown in FIG. 2. For the left predictor, the scan order is $A_0 \rightarrow A_1$, and for the above predictor, the scan order is $B_0 \rightarrow B_1 \rightarrow B_2$. Only the first inherited candidate from each side is selected. No pruning check is performed between two inherited candidates. When a neighbouring affine CU is identified, its control point motion vectors are used to derived the CPMVP candidate in the affine merge list of the current CU. As shown in FIG. 9, if the neighbouring left bottom block A of the current block 910 is coded in affine mode, the motion vectors $v_2$, $v_3$ and $v_4$ of the top left corner, above right corner and left bottom corner of the CU 920 containing block A are attained. When block A is coded with 4-parameter affine model, the two CPMVs of the current CU (i.e., $v_0$ and $v_1$) are calculated according to $v_2$, and $v_3$. In case that block A is coded with 6-parameter affine model, the three CPMVs of the current CU are calculated according to $v_2$, $v_3$ and $v_4$.

Figure 10:
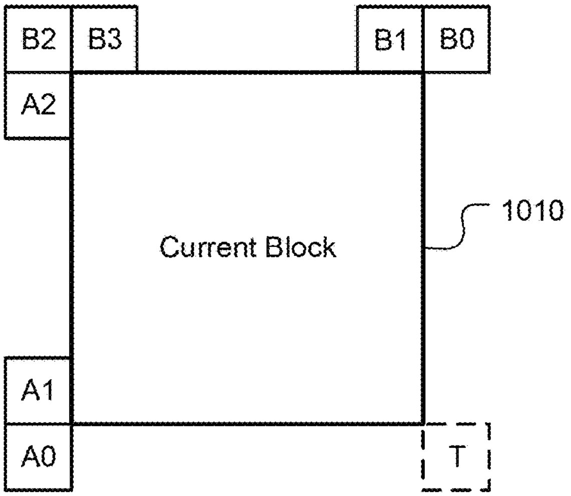
FIG. 10 illustrates an example of affine candidate construction by combining the translational motion information of each control point from spatial neighbours and temporal.

Constructed affine candidate means the candidate is constructed by combining the neighbouring translational motion information of each control point. The motion information for the control points is derived from the specified spatial neighbours and temporal neighbour for a current block 1010 as shown in FIG. 10. $CPMV_k$ (k=1, 2, 3, 4) represents the k-th control point. For $CPMV_1$, the $B_2 \rightarrow B_3 \rightarrow A_2$ blocks are checked and the MV of the first available block is used. For $CPMV_2$, the $B_1 \rightarrow B0$ blocks are checked and for $CPMV_3$, the $A_1 \rightarrow A_0$ blocks are checked. For TMVP is used as $CPMV_4$ if it's available.

After MVs of four control points are attained, affine merge candidates are constructed based on the motion information. The following combinations of control point MVs are used to construct in order:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

Affine AMVP Prediction

Affine AMVP mode can be applied for CUs with both width and height larger than or equal to 16. An affine flag in the CU level is signalled in the bitstream to indicate whether affine AMVP mode is used and then another flag is signalled to indicate whether 4-parameter affine or 6-parameter affine is used. In this mode, the difference of the CPMVs of current CU and their predictors CPMVPs is signalled in the bitstream. The affine AVMP candidate list size is 2 and it is generated by using the following four types of CPVM candidate in order:

- Inherited affine AMVP candidates that extrapolated from the CPMVs of the neighbour CUs
- Constructed affine AMVP candidates CPMVPs that are derived using the translational MVs of the neighbour CUs
- Translational MVs from neighbouring CUs
- Zero MVs The checking order of inherited affine AMVP candidates is the same as the checking order of inherited affine merge candidates. The only difference is that, for AVMP candidate, only the affine CU that has the same reference picture as current block is considered. No pruning process is applied when inserting an inherited affine motion predictor into the candidate list.

Constructed AMVP candidate is derived from the specified spatial neighbours shown in FIG. 10. The same checking order is used as that in the affine merge candidate construction. In addition, the reference picture index of the neighbouring block is also checked. In the checking order, the first block that is inter coded and has the same reference picture as in current CUs is used. When the current CU is coded with the 4-parameter affine mode, and $$mv_0^{\square}$$

and $$mv_1^{\square}$$

are both available, they are added as one candidate in the affine AMVP list. When the current CU is coded with 6-parameter affine mode, and all three CPMVs are available, they are added as one candidate in the affine AMVP list. Otherwise, the constructed AMVP candidate is set as unavailable.

If the number of affine AMVP list candidates is still less than 2 after valid inherited affine AMVP candidates and constructed AMVP candidate are inserted, $$mv_0^{\square}, mv_1^{\square}$$

and $$mv_2^{\square}$$

will be added as the translational MVs in order to predict all control point MVs of the current CU, when available. Finally, zero MVs are used to fill the affine AMVP list if it is still not full.

Affine Motion Information Storage

In VVC, the CPMVs of affine CUs are stored in a separate buffer. The stored CPMVs are only used to generate the inherited CPMVPs in the affine merge mode and affine AMVP mode for the lately coded CUs. The subblock MVs derived from CPMVs are used for motion compensation, MV derivation of merge/AMVP list of translational MVs and de-blocking.

Figure 11:
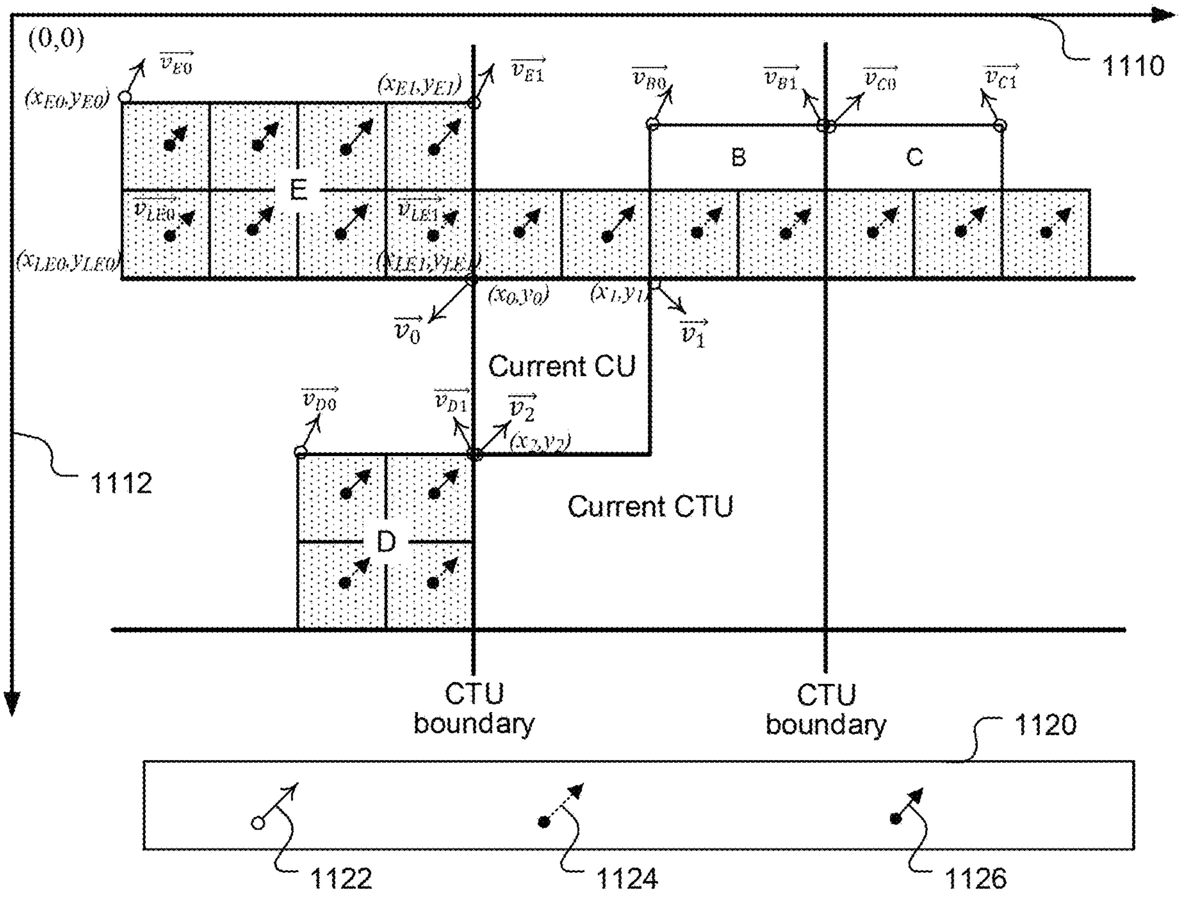
FIG. 11 illustrates an example of affine motion information storage for motion information inheritance.

To avoid the picture line buffer for the additional CPMVs, affine motion data inheritance from the CUs of the above CTU is treated differently for the inheritance from the normal neighbouring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in a local buffer. If the candidate CU is 6-parameter affine coded, the affine model is degraded to 4-parameter model. As shown in FIG. 11, along the top CTU boundary, the bottom-left and bottom right subblock motion vectors of a CU are used for affine inheritance of the CUs in bottom CTUs. In FIG. 11, line 1110 and line 1112 indicate the x and y coordinates of the picture with the origin (0,0) at the upper left corner. Legend 1120 shows the meaning of various motion vectors, where arrow 1122 represents the CPMVs for affine inheritance in the local buff, arrow 1124 represents sub-block vectors for MC/merge/skip/AMVP/deblocking/TMVPs in the local buffer and for affine inheritance in the line buffer, and arrow 1126 represents sub-block vectors for MC/merge/skip/AMVP/deblocking/TMVPs.

Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precisions. Dependent on the mode (normal AMVP mode or affine AVMP mode) for the current CU, the MVDs of the current CU can be adaptively selected as follows:

Normal AMVP mode: quarter-luma-sample, half-luma-sample, integer-luma-sample or four-luma-sample.

Affine AMVP mode: quarter-luma-sample, integer-luma-sample or 1/16 luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signalling is needed and quarter-luma-sample MVD precision is used for the current CU. Otherwise, a second flag is signalled to indicate half-luma-sample or other MVD precisions (integer or four-luma sample) is used for a normal AMVP CU. In the case of half-luma-sample, a 6-tap interpolation filter instead of the default 8-tap interpolation filter is used for the half-luma sample position. Otherwise, a third flag is signalled to indicate whether integer-luma-sample or four-luma-sample MVD precision is used for the normal AMVP CU. In the case of affine AMVP CU, the second flag is used to indicate whether integer-luma-sample or 1/16 luma-sample MVD precision is used. In order to ensure the reconstructed MV has the intended precision (quarter-luma-sample, half-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing the CU-level RD check four times for each MVD resolution, the RD check of MVD precisions other than quarter-luma-sample is only invoked conditionally in VTM11. For the normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for the quarter-luma-sample MVD precision is much smaller than that of the integer-luma-sample MVD precision, the RD check of four-luma-sample MVD precision is skipped. Then, the check of half-luma-sample MVD precision is skipped if the RD cost of integer-luma-sample MVD precision is significantly larger than the best RD cost of previously tested MVD precisions. For the affine AMVP mode, if the affine inter mode is not selected after checking rate-distortion costs of affine merge/skip mode, merge/skip mode, quarter-luma-sample MVD precision normal AMVP mode and quarter-luma-sample MVD precision affine AMVP mode, then 1/16 luma-sample MV precision and 1-pel MV precision affine inter modes are not checked. Furthermore, affine parameters obtained in quarter-luma-sample MV precision affine inter mode are used as starting search point in 1/16 luma-sample and quarter-luma-sample MV precision affine inter modes.

Bi-Prediction with CU-level Weight (BCW)

In HEVC, the bi-prediction signal, $P_{bi-pred}$ is generated by averaging two prediction signals, $P_0$ and $P_1$ obtained from two different reference pictures and/or using two different motion vectors. In VVC, the bi-prediction mode is extended beyond simple averaging to allow weighted averaging of the two prediction signals.

$$P_{bi-pred}=((8-w)*P_0+w*P_1+4)\gg 3 \tag{3}$$

Five weights are allowed in the weighted averaging bi-prediction, $w\in\{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights (w∈{3,4,5}) are used. At the encoder, fast search algorithms are applied to find the weight index without significantly increasing the encoder complexity. These algorithms are summarized as follows. The details are disclosed in the VTM software and document JVET-L0646 (Yu-Chi Su, et. al., "CE4-related: Generalized bi-prediction improvements combined from JVET-L0197 and JVET-L0296", Joint Video Experts Team (JVET) of ITU-T SG 16 WP 3 and ISO/IEC JTC 1/SC 29, 12th Meeting: Macao, CN, 3-12 Oct. 2018, Document: JVET-L0646).

When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP is also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and weight w is inferred to be 4 (i.e. equal weight is applied). For a merge CU, the weight index is inferred from neighbouring blocks based on the merge candidate index. This can be applied to both the normal merge mode and inherited affine merge mode. For the constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CLIP mode, the BCW index of the current CU is set to 2, (i.e., w=4 for equal weight). Equal weight implies the default value for the BCW index.

Combined Inter and Intra Prediction (CIIP)

Figure 12:
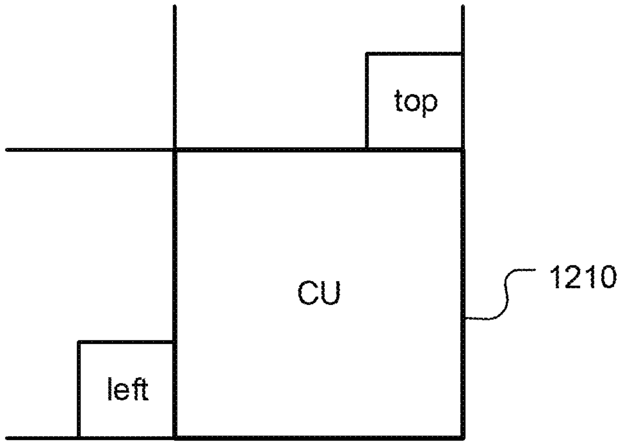
FIG. 12 illustrates an example of the weight value derivation for Combined Inter and Intra Prediction (CIIP) according to the coding modes of the top and left neighbouring blocks.

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value wt is calculated depending on the coding modes of the top and left neighbouring blocks (as shown in FIG. 12) of current CU 1210 as follows:

If the top neighbour is available and intra coded, then set isIntraTop to 1, otherwise set isIntraTop to 0;

If the left neighbour is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntraTop) is equal to 1, then wt is set to 2;

Otherwise, set wt to 1.

The CIIP prediction is formed as follows:

$$P_{CIIP}=((4-wt)*P_{inter}+wt*P_{intra}+2)\gg 2 \quad (4)$$

CCLM (Cross Component Linear Model)

The main idea behind CCLM mode (sometimes abbreviated as LM mode) is that some correlation often exists among colour components (e.g., Y/Cb/Cr, YUV and RGB) of colour pictures. These colours may be referred as first colour, second colour and third colour in this disclosure. CCLM technique exploits the correlation by predicting the chroma components of a block from the collocated reconstructed luma samples by linear models whose parameters are derived from already reconstructed luma and chroma samples that are adjacent to the block.

In VVC, the CCLM mode makes use of inter-channel dependencies by predicting the chroma samples from reconstructed luma samples. This prediction is carried out using a linear model in the form $$P(i,j)=a\cdot rec'_L(i,j)+b. \quad (5)$$

Here, P (i, j) represents the predicted chroma samples in a CU and $$rec'_L(i,j)$$

represents the reconstructed luma samples of the same CU which are down-sampled for the case of non-4:4:4 colour format. The model parameters a and b are derived based on reconstructed neighbouring luma and chroma samples at both encoder and decoder side without explicit signalling.

Three CCLM modes, i.e., CCLM_LT, CCLM_L, and CCLM_T, are specified in VVC. These three modes differ with respect to the locations of the reference samples that are used for model parameter derivation. Samples only from the top boundary are involved in the CCLM_T mode and samples only from the left boundary are involved in the CCLM_L mode. In the CCLM_LT mode, samples from both the top boundary and the left boundary are used.

Overall, the prediction process of CCLM modes consists of three steps:

1) Down-sampling of the luma block and its neighbouring reconstructed samples to match the size of corresponding chroma block, 2) Model parameter derivation based on reconstructed neighbouring samples, and 3) Applying the model equation (1) to generate the chroma intra prediction samples.

Down-sampling of the Luma Component: To match the chroma sample locations for 4:2:0 or 4:2:2: colour format video sequences, two types of down-sampling filter can be applied to luma samples, both of which have a 2-to-1 down-sampling ratio in the horizontal and vertical directions. These two filters correspond to "type-0" and "type-2" 4:2:0 chroma format content, respectively and are given by $$f_1 = \begin{pmatrix} 0 & 1 & 0 \\ 1 & 4 & 1 \\ 0 & 1 & 0 \end{pmatrix}, \quad f_2 = \begin{pmatrix} 1 & 2 & 1 \\ 1 & 2 & 1 \end{pmatrix}. \tag{6}$$

Based on the SPS-level flag information, the 2-dimensional 6-tap (i.e., $f_2$) or 5-tap (i.e., $f_1$) filter is applied to the luma samples within the current block as well as its neighbouring luma samples. The SPS-level refers to Sequence Parameter Set level. An exception happens if the top line of the current block is a CTU boundary. In this case, the one-dimensional filter [1, 2, 1]/4 is applied to the above neighbouring luma samples in order to avoid the usage of more than one luma line above the CTU boundary.

Figure 13:
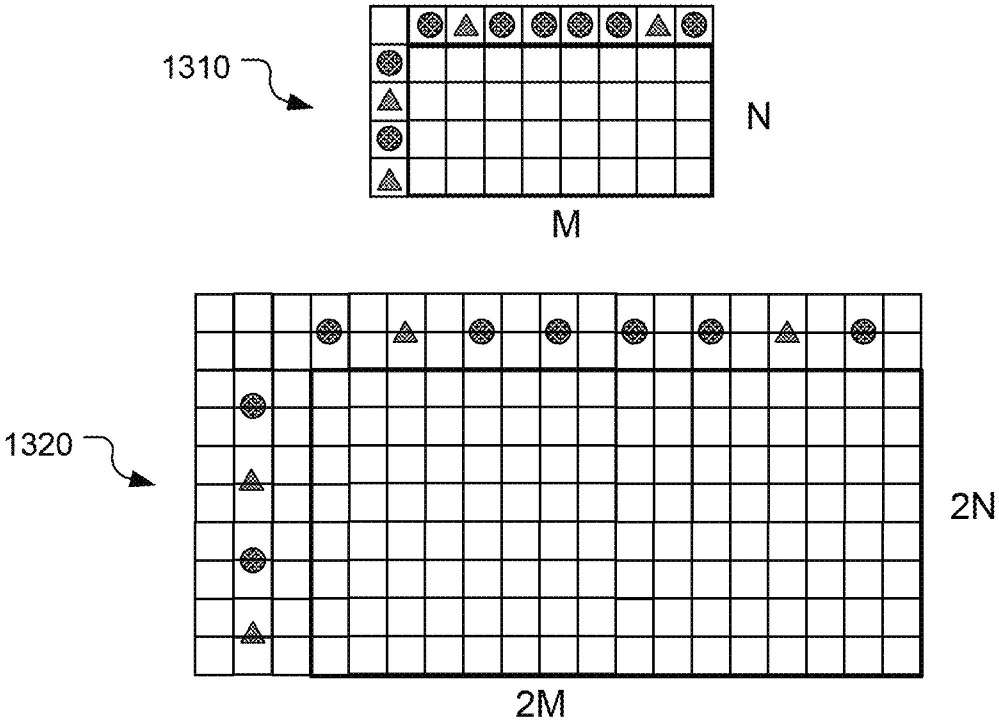
FIG. 13 illustrates an example of model parameter derivation for CCLM (Cross Component Linear Model) using neighbouring chroma samples and neighbouring luma samples.

Model Parameter Derivation Process: The model parameters a and b from eqn. (5) are derived based on reconstructed neighbouring luma and chroma samples at both encoder and decoder sides to avoid the need for any signalling overhead. In the initially adopted version of the CCLM mode, the linear minimum mean square error (LMMSE) estimator was used for derivation of the parameters. In the final design, however, only four samples are involved to reduce the computational complexity. FIG. 13 shows the relative sample locations of M×N chroma block 1310, the corresponding 2M×2N luma block 1320 and their neighbouring samples (shown as filled circles and triangles) of "type-0" content.

In the example of FIG. 13, the four samples used in the CCLM_LT mode are shown, which are marked by triangular shape. They are located at the positions of M/4 and M. ¾ at the top boundary and at the positions of N/4 and N. ¾ at the left boundary. In CCLM_T and CCLM_L modes, the top and left boundary are extended to a size of (M+N) samples, and the four samples used for the model parameter derivation are located at the positions (M+N)/8, (M+N)·⅜, (M+N)·⅝, and (M+N)·⅞.

Once the four samples are selected, four comparison operations are used to determine the two smallest and the two largest luma sample values among them. Let X1 denote the average of the two largest luma sample values and let $X_s$ denote the average of the two smallest luma sample values. Similarly, let $Y_l$ and $Y_s$ denote the averages of the corresponding chroma sample values. Then, the linear model parameters are obtained according to the following equation:

$$a = \frac{Y_l - Y_s}{X_l - X_s} \tag{7}$$

$$b = Y_{s-a} \cdot X_s.$$

In this equation, the division operation to calculate the parameter a is implemented with a look-up table. To reduce the memory required for storing this table, the diff value, which is the difference between the maximum and minimum values, and the parameter a are expressed by an exponential notation. Here, the value of diff is approximated with a 4-bit significant part and an exponent. Consequently, the table for 1/diff only consists of 16 elements. This has the benefit of both reducing the complexity of the calculation and decreasing the memory size required for storing the tables.

MMLM Overview

As indicated by the name, the original CCLM mode employs one linear model for predicting the chroma samples from the luma samples for the whole CU, while in MMLM (Multiple Model CCLM), there can be two models. In MMLM, neighbouring luma samples and neighbouring chroma samples of the current block are classified into two groups, each group is used as a training set to derive a linear model (i.e., particular a and B are derived for a particular group). Furthermore, the samples of the current luma block are also classified based on the same rule for the classification of neighbouring luma samples.

Threshold is calculated as the average value of the neighbouring reconstructed luma samples. A neighbouring sample with Rec'L [x,y]<=Threshold is classified into group 1; while a neighbouring sample with Rec'L [x,y]>Threshold is classified into group 2.

Correspondingly, a prediction for chroma is obtained using linear models:

$$\begin{cases} Pred_C[x, y] = \alpha_1 \times Rec'_L[x, y] + \beta_1 & \text{if } Rec'_L[x, y] \le \text{Threshold} \\ Pred_C[x, y] = \alpha_2 \times Rec'_L[x, y] + \beta_2 & \text{if } Rec'_L[x, y] > \text{Threshold} \end{cases}$$

Chroma Intra Mode Coding

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 3. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM (derived mode) mode, the intra prediction mode of the corresponding luma block covering the centre position of the current chroma block is directly inherited.

TABLE 3

Derivation of chroma prediction mode from luma mode when CCLM is enabled

| Chroma prediction | Corresponding luma intra prediction mode | | | | |
|---|---|---|---|---|---|
| mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 4.

TABLE 4

| Unified binarization table for chroma prediction mode | |
|---|---|
| Value of intra_chroma_pred_mode | Bin string |
| 4 | 00 |
| 0 | 0100 |
| 1 | 0101 |
| 2 | 0110 |
| 3 | 0111 |
| 5 | 10 |
| 6 | 110 |
| 7 | 111 |

The first bin indicates whether it is a regular (i.e., 0) or LM mode (i.e., 1). If it is an LM mode, then the next bin indicates whether it is LM_CHROMA (i.e., 0) or not (i.e., 1). If it is not LM_CHROMA, next bin indicates whether it is LM_L (i.e., 0) or LM_A (i.e., 1). For this case, when sps_cclm_enabled_flag is 0, the first bin of the binarization table for the corresponding intra chroma_pred_mode can be disregarded prior to the entropy coding. Or, in other words, the first bin is inferred to be 0 and hence not coded. This single binarization table is used for both sps_cclm_enabled_flag equal to 0 and 1 cases. The first two bins are context coded with its own context model, and the rest bins are bypass coded.

Multi-Hypothesis Prediction (MHP)

In the multi-hypothesis inter prediction mode (JVET-M0425), one or more additional motion-compensated prediction signals are signalled, in addition to the conventional bi-prediction signal. The resulting overall prediction signal is obtained by sample-wise weighted superposition. With the bi-prediction signal $p_{bi}$ and the first additional inter prediction signal/hypothesis $h_3$, the resulting prediction signal p3 is obtained as follows:

$$p_3 = (1-\alpha)p_{bi} + \alpha h_3 \quad (8)$$

The weighting factor α is specified by the new syntax element add_hyp_weight_idx, according to the following mapping (Table 5):

TABLE 5

| Mapping α to add_hyp_weight_idx | |
|---|---|
| add_hyp_weight_idx | α |
| 0 | 1/4 |
| 1 | −1/8 |

Analogously to above, more than one additional prediction signal can be used. The resulting overall prediction signal is accumulated iteratively with each additional prediction signal.

$$P_{n+1} = (1-\alpha_{n+1})_{P_n} + \alpha_{n+1} h_{n+1} \quad (9)$$

The resulting overall prediction signal is obtained as the last $p_n$ (i.e., the $p_n$ having the largest index n). For example, up to two additional prediction signals can be used (i.e., n is limited to 2).

The motion parameters of each additional prediction hypothesis can be signalled either explicitly by specifying the reference index, the motion vector predictor index, and the motion vector difference, or implicitly by specifying a merge index. A separate multi-hypothesis merge flag distinguishes between these two signalling modes.

For inter AMVP mode, MHP is only applied if non-equal weight in BCW is selected in bi-prediction mode. Details of MHP for VVC can be found in JVET-W2025 (Muhammed Coban, et. al., "Algorithm description of Enhanced Compression Model 2 (ECM 2)", Joint Video Experts Team (JVET) of ITU-T SG 16 WP 3 and ISO/IEC JTC 1/SC 29, 23rd Meeting, by teleconference, 7-16 Jul. 2021, Document: JVET-W2025).

Intra Mode Coding with 67 Intra Prediction Modes

Figure 14:
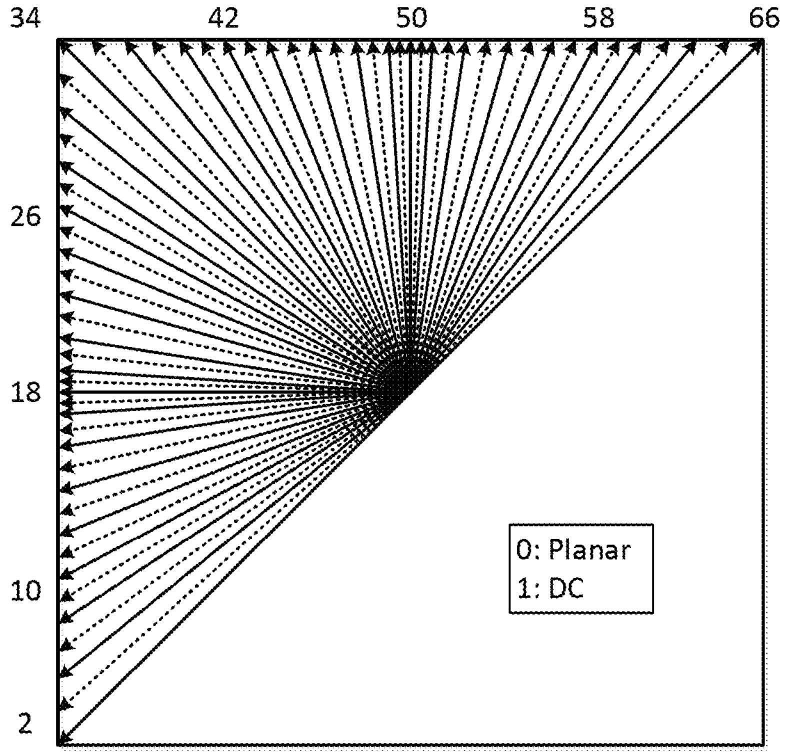
FIG. 14 shows the intra prediction modes as adopted by the VVC video coding standard.

To capture the arbitrary edge directions presented in natural video, the number of directional intra modes in VVC is extended from 33, as used in HEVC, to 65. The new directional modes not in HEVC are depicted as dotted arrows in FIG. 14, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

To keep the complexity of the most probable mode (MPM) list generation low, an intra mode coding method with 6 MPMs is used by considering two available neighbouring intra modes. The following three aspects are considered to construct the MPM list:

- Default intra modes
- Neighbouring intra modes
- Derived intra modes.

A unified 6-MPM list is used for intra blocks irrespective of whether MRL and ISP coding tools are applied or not. The MPM list is constructed based on intra modes of the left and above neighbouring block. Suppose the mode of the left is denoted as Left and the mode of the above block is denoted as Above, the unified MPM list is constructed as follows:

- When a neighbouring block is not available, its intra mode is set to Planar by default.
- If both modes Left and Above are non-angular modes:
  - MPM list→{Planar, DC, V, H, V−4, V+4}
- If one of modes Left and Above is angular mode, and the other is non-angular:
  - Set a mode Max as the larger mode in Left and Above
  - MPM list→ {Planar, Max, DC, Max−1, Max+1, Max−2}
- If Left and Above are both angular and they are different:
  - Set a mode Max as the larger mode in Left and Above
  - if the difference of mode Left and Above is in the range of 2 to 62, inclusive.
    - MPM list→{Planar, Left, Above, DC, Max−1, Max+1}
  - Otherwise.
    - MPM list→{Planar, Left, Above, DC, Max−2, Max+2}
- If Left and Above are both angular and they are the same:

MPM list→{Planar, Left, Left−1, Left+1, DC, Left−2}

Besides, the first bin of the MPM index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

Figure 15A:
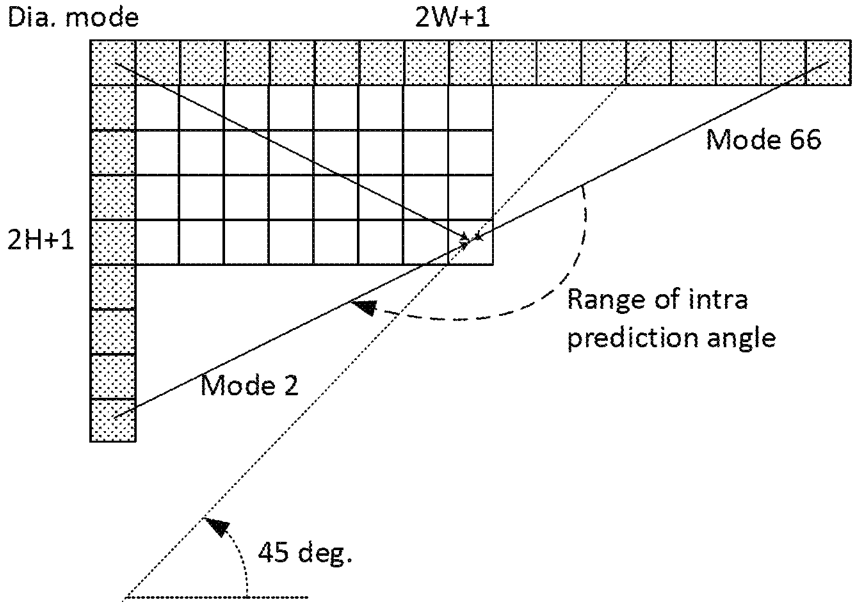
FIGS. 15A-B illustrate examples of wide-angle intra prediction a block with width larger than height (FIG. 15A) and a block with height larger than width (FIG. 15B).
Figure 15B:
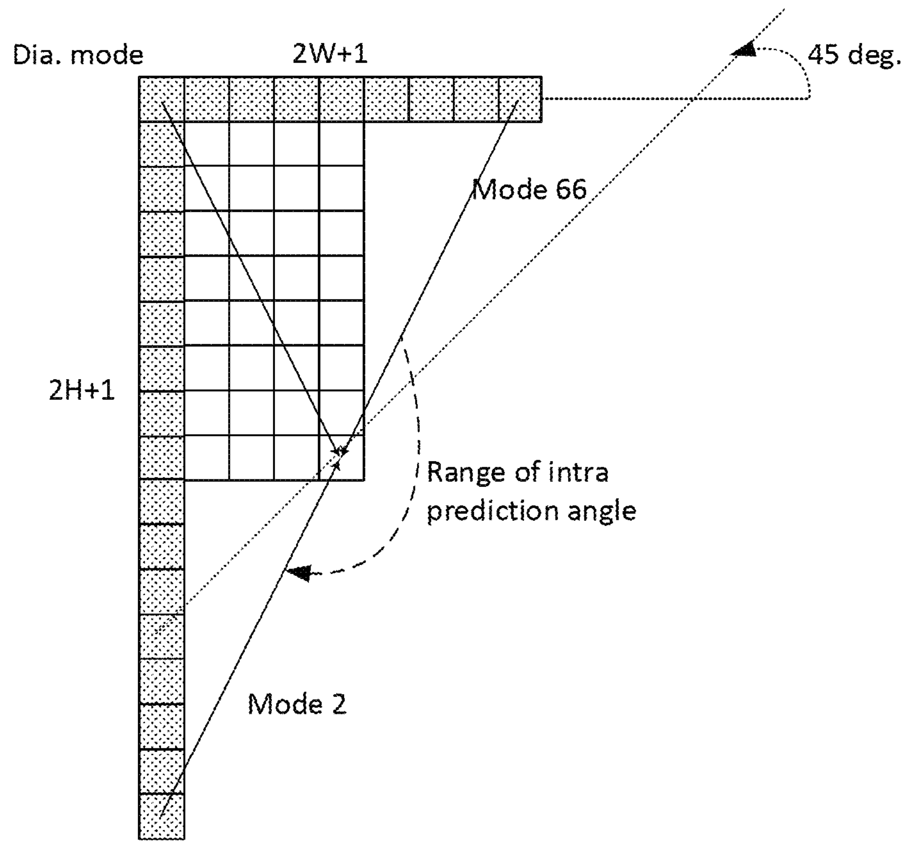

To support these prediction directions, the top reference with length 2W+1, and the left reference with length 2H+1, are defined as shown in FIG. 15A and FIG. 15B respectively.

The number of replaced modes in wide-angular direction mode depends on the aspect ratio of a block. The replaced intra prediction modes are illustrated in Table 6.

TABLE 6

Intra prediction modes replaced by wide-angular modes

| Aspect ratio | Replaced intra prediction modes |
|---|---|
| W/ H = 16 | Modes 12, 13, 14, 15 |
| W/ H = 8 | Modes 12, 13 |
| W/ H = 4 | Modes 2, 3, 4, 5, 6, 7, 8, 9, 10, 11 |
| W/H = 2 | Modes 2, 3, 4, 5, 6,7, |
| W/H = 1 | None |
| W/ H = ½ | Modes 61, 62, 63, 64, 65, 66 |
| W/ H = ¼ | Mode 57, 58, 59, 60, 61, 62, 63, 64, 65, 66 |
| W/ H = ⅛ | Modes 55, 56 |
| W/ H = 1/16 | Modes 53, 54, 55, 56 |

Figure 16:
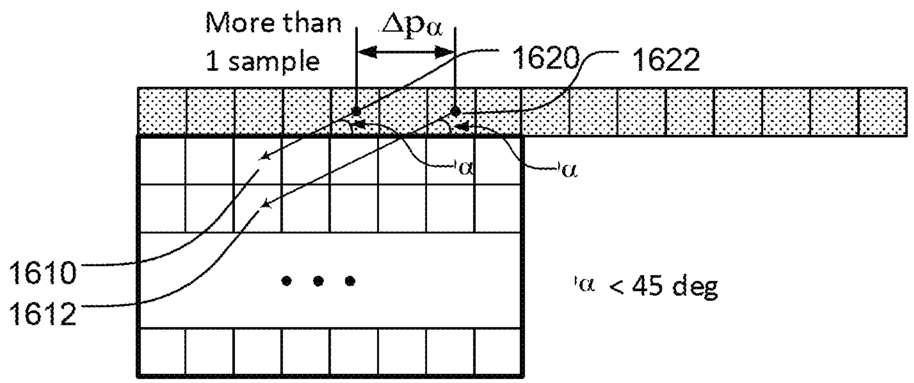
FIG. 16 illustrate examples of two vertically-adjacent predicted samples using two non-adjacent reference samples in the case of wide-angle intra prediction.

As shown in FIG. 16, two vertically-adjacent predicted samples (samples 1610 and 1612) may use two non-adjacent reference samples (samples 1620 and 1622) in the case of wide-angle intra prediction. Hence, low-pass reference samples filter and side smoothing are applied to the wide-angle prediction to reduce the negative effect of the increased gap $\Delta p\alpha$. If a wide-angle mode represents a non-fractional offset. There are 8 modes in the wide-angle modes satisfy this condition, which are [−14, −12, −10, 6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135° and above 45°, luma intra prediction modes ranging from 2 to 5 are mapped to 2. Therefore, chroma DM derivation table for 4:2:2: chroma format is updated by replacing some values of the entries of the mapping table to convert prediction angle more precisely for chroma blocks.

Decoder Side Intra Mode Derivation (DIMD)

When DIMD is applied, two intra modes are derived from the reconstructed neighbour samples, and those two predictors are combined with the planar mode predictor with the weights derived from the gradients. The DIMD mode is used as an alternative prediction mode and is always checked in the high-complexity RDO mode.

To implicitly derive the intra prediction modes of a blocks, a texture gradient analysis is performed at both the encoder and decoder sides. This process starts with an empty Histogram of Gradient (HoG) with 65 entries, corresponding to the 65 angular modes. Amplitudes of these entries are determined during the texture gradient analysis.

In the first step, DIMD picks a template of T-3 columns and lines from respectively left side and above side of the current block. This area is used as the reference for the gradient based intra prediction modes derivation.

In the second step, the horizontal and vertical Sobel filters are applied on all 3×3 window positions, centered on the pixels of the middle line of the template. At each window position, Sobel filters calculate the intensity of pure horizontal and vertical directions as $G_x$ and $G_y$, respectively. Then, the texture angle of the window is calculated as:

$$\text{angle} = \arctan(G_x / G_y), \tag{10}$$

which can be converted into one of 65 angular intra prediction modes. Once the intra prediction mode index of current window is derived as idx, the amplitude of its entry in the HoG[idx] is updated by addition of:

$$ampl = |G_x| + |G_y| \tag{11}$$

Figure 17A:
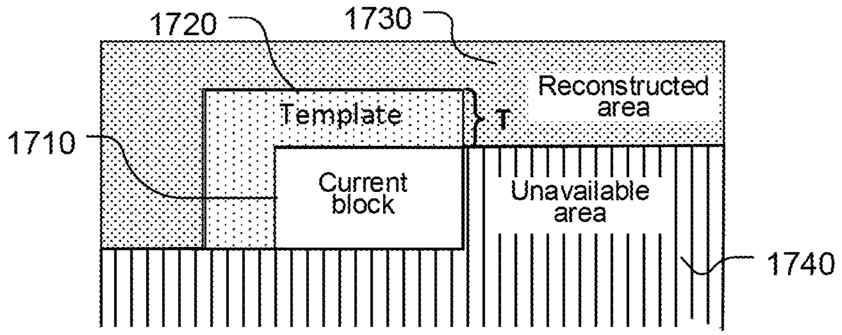
FIG. 17A illustrates an example of selected template for a current block, where the template comprises T lines above the current block and T columns to the left of the current block.
Figure 17B:
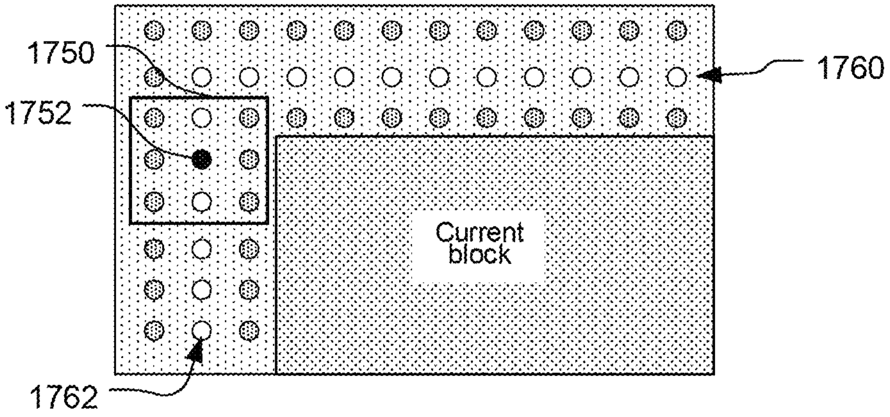
FIG. 17B illustrates an example for T-3 and the HoGs (Histogram of Gradient) are calculated for pixels in the middle line and pixels in the middle column.
Figure 17C:
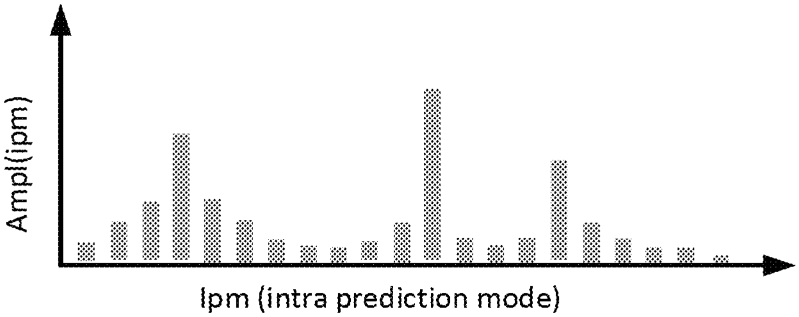
FIG. 17C illustrates an example of the amplitudes (ampl) for the angular intra prediction modes.

FIGS. 17A-C show an example of HoG, calculated after applying the above operations on all pixel positions in the template. FIG. 10A illustrates an example of selected template 1720 for a current block 1710. Template 1720 comprises T lines above the current block and T columns to the left of the current block. For intra prediction of the current block, the area 1730 at the above and left of the current block corresponds to a reconstructed area and the area 1740 below and at the right of the block corresponds to an unavailable area. FIG. 17B illustrates an example for T=3 and the HoGs are calculated for pixels 1760 in the middle line and pixels 1762 in the middle column. For example, for pixel 1752, a 3×3 window 1750 is used. FIG. 17C illustrates an example of the amplitudes (ampl) calculated based on equation (11) for the angular intra prediction modes as determined from equation (10).

Figure 18:
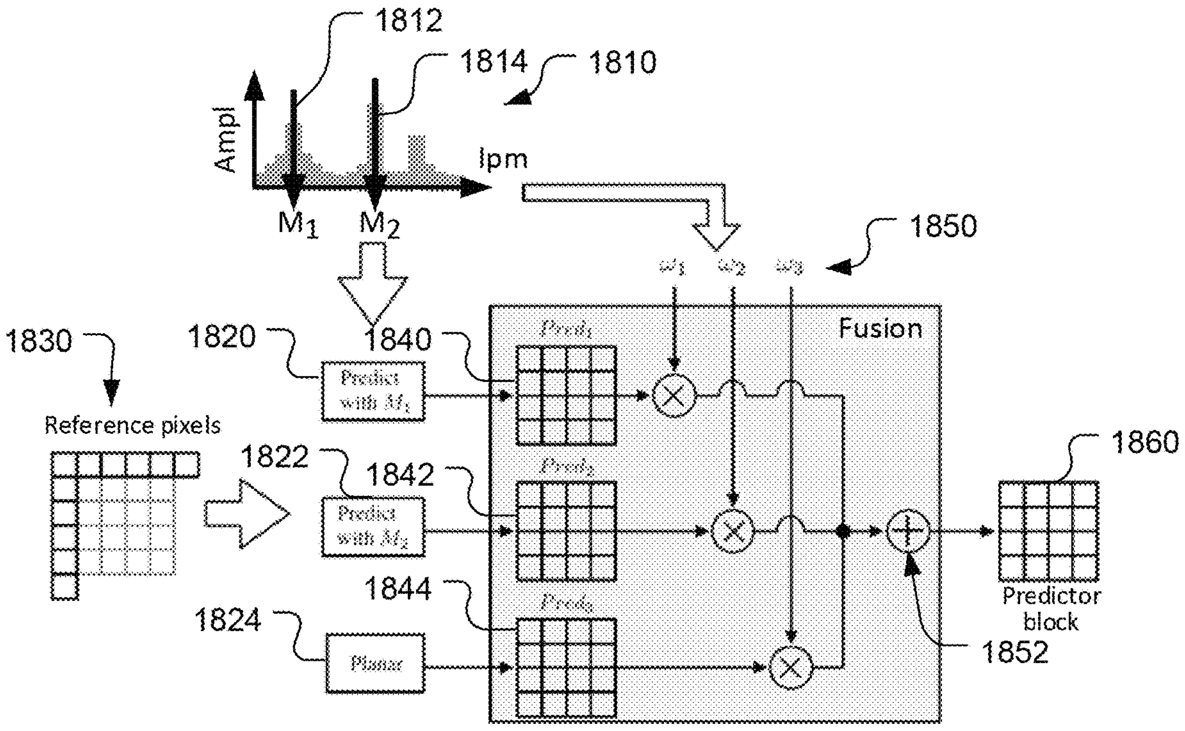
FIG. 18 illustrates an example of the blending process, where two intra modes (M1 and M2) and the planar mode are selected according to the indices with two tallest bars of histogram bars.

Once HoG is computed, the indices with two tallest histogram bars are selected as the two implicitly derived intra prediction modes for the block and are further combined with the Planar mode as the prediction of DIMD mode. The prediction fusion is applied as a weighted average of the above three predictors. To this aim, the weight of planar is fixed to 21/64 (~⅓). The remaining weight of 43/64 (~⅔) is then shared between the two HoG IPMs, proportionally to the amplitude of their HoG bars. FIG. 18 illustrates an example of the blending process. As shown in FIG. 18, two intra modes (M1 1812 and M2 1814) are selected according to the indices with two tallest bars of histogram bars 1810. The three predictors (1840, 1842 and 1844) are used to form the blended prediction. The three predictors correspond to applying the M1, M2 and planar intra modes (1820, 1822 and 1824 respectively) to the reference pixels 1830 to form the respective predictors. The three predictors are weighted by respective weighting factors (ω1, ω2 and ω3) 1850. The weighted predictors are summed using adder 1852 to generated the blended predictor 1860.

Besides, the two implicitly derived intra modes are included into the MPM list so that the DIMD process is performed before the MPM list is constructed. The primary derived intra mode of a DIMD block is stored with a block and is used for MPM list construction of the neighbouring blocks.

Template-Based Intra Mode Derivation (TIMD)

Figure 19:
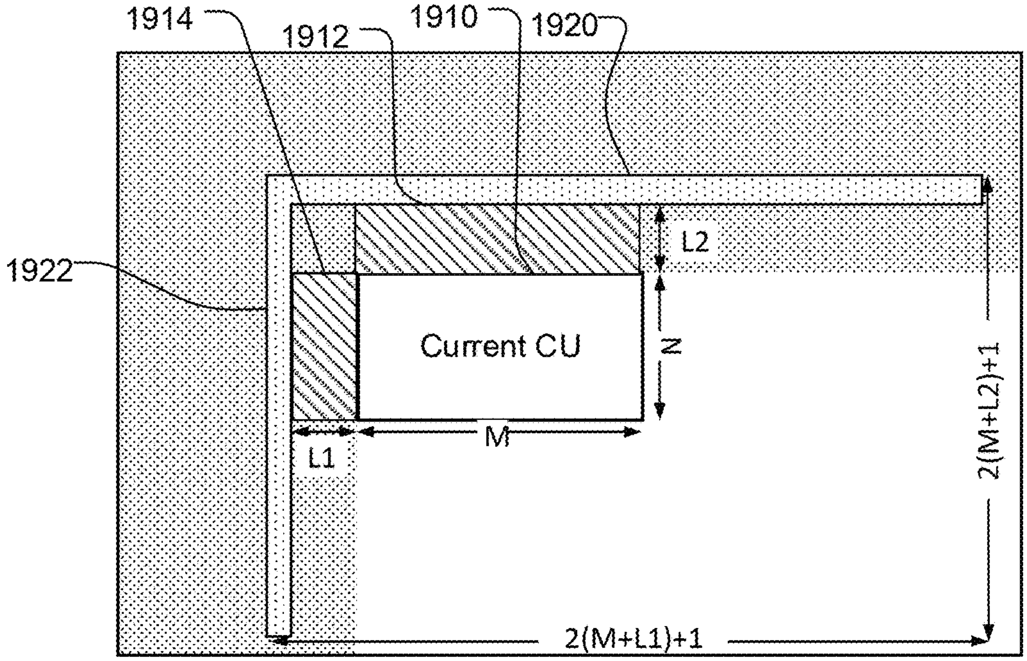
FIG. 19 illustrates an example of template-based intra mode derivation (TIMD) mode, where TIMD implicitly derives the intra prediction mode of a CU using a neighbouring template at both the encoder and decoder.

Template-based intra mode derivation (TIMD) mode implicitly derives the intra prediction mode of a CU using a neighbouring template at both the encoder and decoder, instead of signalling the intra prediction mode to the decoder. As shown in FIG. 19, the prediction samples of the template (1912 and 1914) for the current block 1910 are generated using the reference samples (1920 and 1922) of the template for each candidate mode. A cost is calculated as the SATD (Sum of Absolute Transformed Differences) between the prediction samples and the reconstruction samples of the template. The intra prediction mode with the minimum cost is selected as the DIMD mode and used for intra prediction of the CU. The candidate modes may be 67 intra prediction modes as in VVC or extended to 131 intra prediction modes. In general, MPMs can provide a clue to indicate the directional information of a CU. Thus, to reduce the intra mode search space and utilize the characteristics of a CU, the intra prediction mode can be implicitly derived from the MPM list.

For each intra prediction mode in MPMs, the SATD between the prediction and reconstruction samples of the template is calculated. First two intra prediction modes with the minimum SATD are selected as the TIMD modes. These two TIMD modes are fused with weights after applying PDPC process, and such weighted intra prediction is used to code the current CU. Position dependent intra prediction combination (PDPC) is included in the derivation of the TIMD modes.

The costs of the two selected modes are compared with a threshold, in the test, the cost factor of 2 is applied as follows:

$$costMode2 < 2 * costMode1.$$

If this condition is true, the fusion is applied, otherwise only model is used. Weights of the modes are computed from their SATD costs as follows:

$$weight1 = costMode2 / (costMode1 + costMode2)$$

$$weight2 = 1 - weight1.$$

To improve video coding efficiency, more and more coding tools are designed for generating/refining the predictors of an intra and/or inter block. Intra/inter here is defined in the standard with mode types. For example, intra refers to mode type intra and inter refers to mode type inter. The proposed methods are not limited to being used for improving blocks with traditional mode types and may be used for blocks with any mode type defined in the standard. With the traditional mechanism, an inter mode utilizes temporal information to predict the current block and for an intra block, spatially neighbouring reference samples are used to predict the current block. In this invention, the coding tool is to use cross-component information to predict or further improve the predictors of the current block. The concept of the coding tool is described as follows.

First, the colour components (e.g. Y, Cb, and Cr) for the current block are grouped into several sets and one colour component is selected to be the representative colour component of each set.

In one embodiment, Y is in the first set, and Cb and Cr are in the second set. For example, Y is the representative colour component of the first set. For another example, one of Cb and Cr is the representative colour component of the second set. For another example, for the second set, the information from the representative colour component is the averaged information from Cb and Cr.

In another embodiment, Y is in the first set, Cb is in the second set, and Cr is in the third set. The representative colour components of the first, second, and third sets are Y, Cb, and Cr, respectively.

In another embodiment, Cb is in the first set and Cr is in the second set. The representative colour components of the first and second sets are Cb and Cr, respectively.

Second, the neighbouring samples (which can be neighbouring reconstructed or predicted samples) for the first representative colour component and the second (or third) representative colour component are used to generate the model parameters.

In another embodiment, the model is a linear model and the model parameters include alpha and beta.

Third, the model parameters are performed on the samples (belonging to the first set) within the current block (which can be current reconstructed or current predicted samples) to obtain the cross-component predictors (denoted as P) for the second (or third) set.

$$P(i, j) = \text{alpha} \cdot rec_{first\_set}(i, j) + \text{beta}$$

$$\text{or } P(i, j) = \text{alpha} \cdot pred_{first\_set}(i, j) + \text{beta}$$

If the first set is for the luma component and the second (or third) set is for chroma component, down-sampling process is applied to the first set.

In another sub-embodiment, the cross-component predictors can be the final predictors for the second (or third) set.

In another sub-embodiment, the cross-component predictors are blended with the existing predictors for the second (or third) set. This is an example of blending one additional hypothesis of prediction on top of the existing hypothesis of prediction. The proposed methods are not limited to only blending one additional hypothesis of prediction and can be extended to blending more than one hypotheses of predictions.

$$P_{final}(i, j) = (w1 \cdot P_{existing}(i, j) + w2 \cdot P + c) \gg d$$

For example, w1 and w2 can be sample-based. Each sample derives its own weighting. When template-matching setting is used, one prediction is suggested from the above template and another prediction is suggested from the left template. The weighting depends on the distance between the current sample and the above template and/or the distance between the current sample and the left template. A sample nearing the above template has a higher weight for the prediction from the candidate suggested by the above template. A sample nearing the left template has a higher weight for the prediction from the candidate suggested by the left template. The proposed method can be used for boundary-matching setting and/or model-accuracy setting. In one embodiment, $P_{existing}$ is generated by one mode suggested by the sub-template and P is generated by the other mode suggested by the other sub-template. In another embodiment, $P_{existing}$ is indicated by signalling and more than one P's are generated by more than one modes suggested by the sub-templates.

For another example, w1 and w2 are uniform for the current block. The weighting depends on the costs for the P and $P_{existing}$. When template-matching setting is used, the prediction with a smaller template matching cost has a higher weight. When boundary-matching setting is used, the prediction with a smaller boundary matching cost has a higher weight. When model-accuracy setting is used, the prediction with a smaller distortion has a higher weight. In one embodiment, $P_{existing}$ is the mode with smallest template matching cost (or boundary matching cost/model-accuracy distortion) and/or P is the mode with the second smallest template matching cost (or boundary matching cost/model-accuracy distortion). When more hypotheses of predictions are blended, more modes with small template matching costs (or boundary matching costs/model-accuracy distortions) are used. In another embodiment, $P_{existing}$ is indicated by signalling and the proposed setting is used to determine the weighting and/or the to-be-blended one or more P's.

For another example, w1 and w2 depend on the neighbouring blocks. When the number of neighbouring intra (or CCLM) blocks is more than the number of neighbouring inter (or non-intra or non-CCLM) blocks, w2 is larger than w1.

The neighbour blocks mean the top and left neighbours.

The neighbour blocks mean any pre-defined 4×4 blocks around the left side and top side of the current block.

In the above example, the final predictor (i.e., $P_{final}(i, j)$) comprises one portion of the first predictor (i.e., $w1 \cdot P_{existing}(i,j)$) and one portion of said at least one second predictor (i.e., w2·P). In one embodiment, $P_{existing}$ is from a cross-component mode. In another embodiment, $P_{existing}$ is intra-prediction, inter-prediction, or a third-type-prediction. The prediction type of $P_{existing}$ implies the mode type of the current block. When the $P_{existing}$ is intra-prediction, the current block is mode type intra. When the $P_{existing}$ is inter-prediction, the current block is mode type inter. When the $P_{existing}$ is a third-type-prediction, the current block is a third mode type. The third-type-prediction may be generated by using intra block copy scheme to predict from a previously reconstructed block within the same picture through (1) a displacement vector (called block vector or BV) to indicate the relative displacement from the position of the current block to that of the reference block and/or (2) a template matching mechanism to search the reference block in a pre-defined searching region, and/or the third mode type may refer to intra block copy (IBC) or a special intra mode type such as intra template matching prediction (intra TMP). While a specific equation is used to illustrate combining two predictors to form a final predictor, the specific form should not be construed as a limitation to the present invention. For example, an offset may be added to the weighted sum of the first predictor and the second predictor prior to the shift operation (i.e., ">>d"). Furthermore, w1 and w2 can be expressed as w1(i,j) and w2 (i,j) since the w1 and w2 can be sample-based in one embodiment.

In another sub-embodiment, the coding tool corresponds to CCLM or MMLM.

In another sub-embodiment, the coding tool corresponds to the tool which utilizes the cross-component information to improve the predictors of the current block. The coding tool can include various candidate modes. Different modes can use different ways to derive the model parameters. For example, the coding tool corresponds to CCLM and the candidate modes correspond to CCLM_LT, CCLM_L, CCLM_T, or any combination of the above. For another example, the coding tool corresponds to MMLM and the candidate modes correspond to MMLM_LT, MMLM_L, MMLM_T, or any combination of the above. For another example, the coding tool corresponds to the LM family (including CCLM and MMLM) and the candidate modes correspond to CCLM_LT, CCLM_L, CCLM_T, MMLM_LT, MMLM_L, MMLM_T or any combination of the above. For example, convolutional cross-component mode (CCCM) is a cross-component mode. When this cross-component mode is applied to the current block, cross-component information with one or more models, including non-linear term and/or deriving using a pre-defined regression method, is used to generate the chroma prediction. This cross-component mode may follow the template selection of CCLM, so CCCM family includes CCCM_LT CCCM_L, and/or CCCM T. For another example, gradient linear model (GLM) using luma sample gradients to predict the chroma samples is a cross-component mode. Candidates of GLM mode may refer to different gradient filters and/or different variations of GLM. Different GLM variations may use one or more two-parameter models and/or one or more three-parameter models. When using two-parameter GLM, luma sample gradients are utilized to derive the linear model. When using three-parameter GLM, a chroma sample can be predicted based on both the luma sample gradients and down-sampled luma values with different parameters. The model parameters of the three-parameter GLM are derived as the pre-defined regression method for CCCM. One example of the pre-defined regression method is using 6 rows and columns of adjacent samples by the decomposition-based minimization method. For another example, for a cross-component mode, difference candidates refer to different down-sampling processes (e.g. down-sampling filters). That is, for a cross-component mode, luma samples are first down-sampled using a selected down-sampling filter and then used for deriving the model parameters and/or predicting chroma samples. When applying template-matching setting (or boundary matching setting/model accuracy setting) to select the down-sampling filter, a template (or boundary) including N1-line neighboring samples adjacent to above of the current chroma block and/or N2-line neighboring samples adjacent to left of the current chroma block is pre-defined to measure the cost for each candidate filter. The cost for a candidate filter is between the reconstructed chroma samples and the corresponding predictors for each candidate filter in the pre-defined template (or boundary). Finally, the filter candidate with the smallest cost is selected as the down-sampling filter to generate the prediction for the current block. N1 and N2 are any pre-defined integers such as 1, 2, 4, 8, or adaptive values depending on block width, block height, and/or block area. More line setting of N1 and/or N2 can reference n and/or m lines as described in the boundary-matching setting section.

In another embodiment, an explicit rule is used to decide whether to enable or disable the coding tool and/or the explicit rule is used to decide the candidate mode when the coding tool is enabled. For example, a flag is signalled/parsed at the block level. If the flag is true, the coding tool is applied to the current block; otherwise, the coding tool is disabled for the current block.

In another embodiment, an implicit rule is used to decide whether to enable or disable the coding tool and/or the implicit rule is used to decide the candidate mode when the coding tool is enabled. For example, the implicit rule depends on the template-matching setting, boundary-matching setting, or model-accuracy setting.

In another embodiment, Cb and Cr can use different candidate modes.

In another embodiment, the implicit rule for intra and inter blocks can be unified. For example, when template-setting is used as the implicit rule, the derivation process for the template setting for an inter block is unified with the process for an intra block (e.g. a TIMD block).

In another embodiment, the threshold used in template matching and/or boundary matching and/or model accuracy can depend on the block size of the current block, sequence resolution, neighbouring blocks, and/or QP.

Template-Matching Setting

Figure 20:
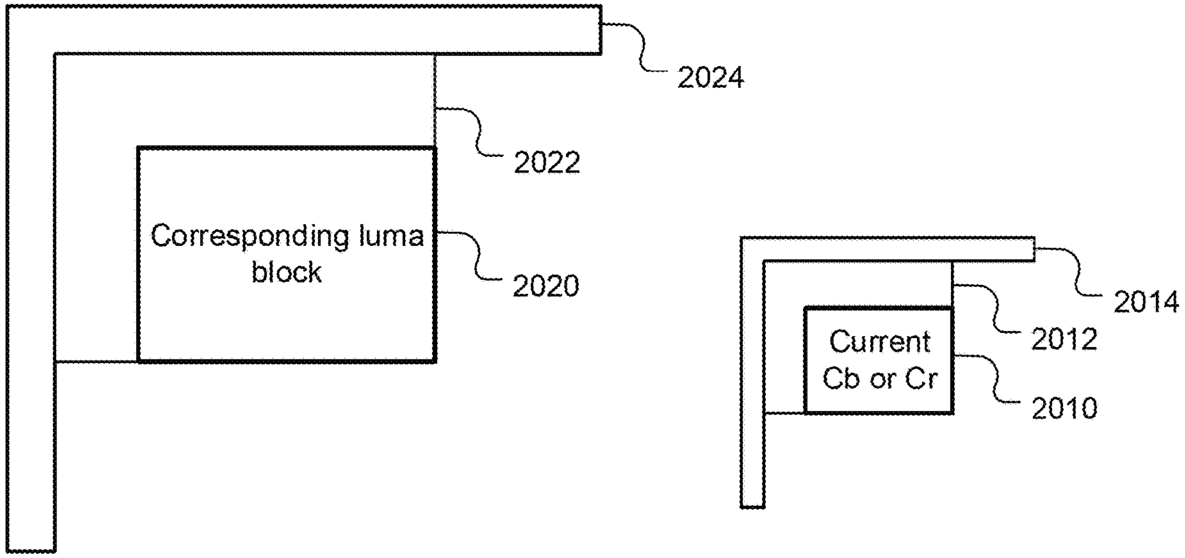
FIG. 20 illustrates an example of the templates and reference samples of the templates for luma and chroma to derive the model parameters and the template-matching distortion.

- Step 0: When template matching setting is used, the model parameters for each candidate mode are derived based on the reference samples of the template for luma and chroma and then performed the derived model parameters on the template (i.e., neighbouring region) of the current block. FIG. 20 illustrates an example of the templates and reference samples of the templates for luma and chroma to derive the model parameters and the distortion. In FIG. 20, block 2010 represents a current chroma block (Cb or Cr) and block 2020 represents a corresponding luma block. Area 2012 corresponds to the chroma template and area 2014 corresponds to the reference samples of the chroma template. Area 2022 corresponds to the luma template and area 2024 corresponds to the reference samples of the luma template.
- Take LM family as an example as follows:
  - Different model parameters are derived by the different LM modes (i.e., a candidate set).
    - Derive the model parameters for each LM mode (i.e., each candidate mode) by using the reference samples (reconstructed or predicted samples) of templates for luma and chroma to derive the model parameters (e.g. alpha and beta).
    - Then, the model parameters derived may include for respective candidate modes:
      - $alphac_{CLM\_LT\_cb}$, $betac_{CLM\_LT\_cb}$, $alphac_{CLM\_LT\_cr}$, $betac_{CLM\_LT\_er}$
      - $alphac_{CLM\_L\_cb}$, $betac_{CLM\_L\_cb}$, $alphac_{CLM\_L\_cr}$, $betac_{CLM\_L\_cr}$
      - $alphac_{CLM\_T\_cb}$, $betac_{CLM\_T\_cb}$, $alpha_{CCLM\_T\_cr}$, $betac_{CLM\_T\_cr}$
      - $alpha_{MMLM\_LT\_cb}$, $beta_{MMLM\_LT\_cb}$, $alpha_{MMLM\_LT\_cr}$, $beta_{MMLM\_LT\_cr}$
      - $alpha_{MMLM\_L\_cb}$, $beta_{MMLM\_L\_cb}$, $alpha_{MMLM\_L\_cr}$, $beta_{MMLM\_L\_cr}$
      - $alpha_{MMLM\_T\_cb}$, $beta_{MMLM\_T\_cb}$, $alpha_{MMLM\_T\_cr}$, $beta_{MMLM\_T\_cr}$
- Step 1: Take the reconstructed samples on the template of current block as the golden data (i.e., the target data to be compared with or to be matched with).
- Step 2: For each candidate mode, apply the derived model parameters to the template of corresponding luma block to obtain the predicted samples within the template of the current chroma block
- Step 3: For each candidate mode, calculate the distortion between the golden data and the predicted samples on the template.
- Step 4: Decide the mode for the current block according to the calculated distortions.
  - In another sub-embodiment, the candidate mode with the smallest distortion is selected and used for the current block.
  - In another sub-embodiment, the model parameters for the candidate mode with the smallest distortion is selected and used for the current block.
  - In another sub-embodiment, regarding the enabling condition of the coding tool, the coding tool can be applied to the current block when the minimum distortion is smaller than a pre-defined threshold.
    - For example, the pre-defined threshold is T*template area.
      - T can be any floating value or 1/N. (N can be any positive integer)
      - Template area is set as template width*the current block height+template height*the current block width.
    - For another example, the pre-defined threshold is the distortion between the reconstructed samples of the template for the current block and the predicted samples of the template generated from the default mode (original mode, not refined with the proposed coding tool). When the cross-component prediction is used to refine the inter prediction, the default mode is the original inter mode which can be a regular, merge candidate, AMVP candidate, an affine candidate, an GPM candidate, or any one of merge candidates.
  - In another sub-embodiment,
    - If the minimum distortion for Cb is smaller than the pre-defined threshold, the candidate mode with the smallest distortion is used for Cb.
    - Otherwise, no candidate mode can be applied to Cb.
    - If the minimum distortion for Cr is smaller than the pre-defined threshold, the candidate mode with the smallest distortion is used for Cr.
    - Otherwise, no candidate mode can be applied to Cr
  - In another sub-embodiment, whether to apply any candidate mode to Cb and Cr is decided at the same time. (Take LM as an example. When LM is applied to Cb, LM is also applied to Cr.)
    - If the minimum distortion for Cb and the minimum distortion for Cr is smaller than the pre-defined threshold, LM is applied to Cb and Cr.
    - Otherwise, LM is not applied to Cb and Cr.

If the minimum distortion for Cb or the minimum distortion for Cr is smaller than the pre-defined threshold, LM is applied to Cb and Cr.

Otherwise, LM is not applied to Cb and Cr.

In another embodiment, the template size can be adjusted as the description in the boundary-matching setting. (e.g. n and/or m lines as described in the boundary-matching setting section)

As described in the above TM based method, a second-colour template comprising selected neighbouring samples of the second-colour block and a first-colour template comprising corresponding neighbouring samples of the first-colour block are determined. For example, the first-colour can be the luma signal and the second-colour can be one of the chroma components or both. In another example, the first-colour can be one (e.g. Cb/Cr) of the chroma components and the second-colour can be another (e.g. Cr/Cb) of the chroma components. A set of model parameters (e.g. alpha and beta) are determined for each prediction model of the candidate set based on reference samples of the first-colour template and reference samples of the second-colour template. The candidate set may comprise some modes selected from CCLM_TL, CCLM_T, CCLM_L, MMLM_TL, MMLM_T and MMLM_L. An example of the template is shown in FIG. 20. However, the template may comprise the top template only, the left template only or both the top and the left templates. In another example, the template selection may depend on the coding mode information for the current block or the candidate types of the candidates in the candidate set.

Boundary-Matching Setting

Figure 21:
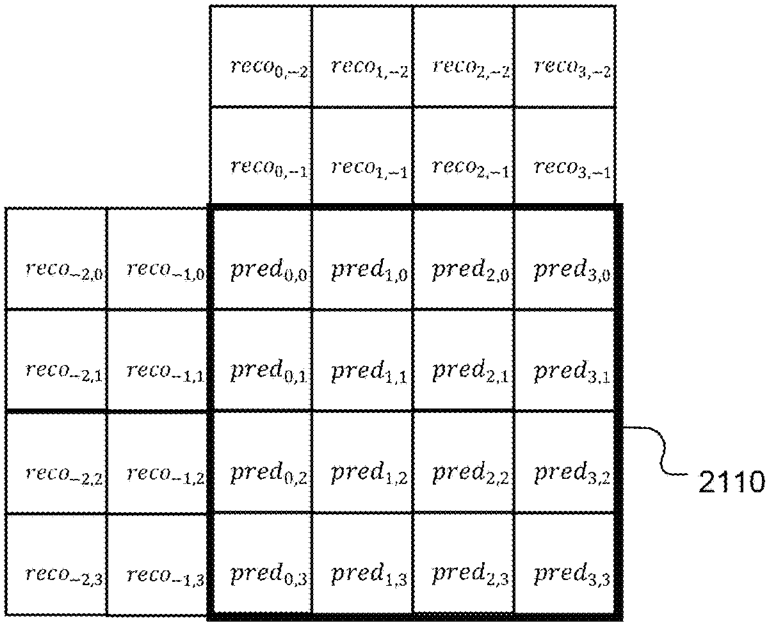
FIG. 21 illustrates an example of boundary matching, which measures the discontinuity measurement between the current prediction and the neighbouring reconstruction.

When boundary-matching setting is used, a boundary matching cost for a candidate mode refers to the discontinuity measurement (including top boundary matching and/or left boundary matching) between the current prediction (i.e., the predicted samples within the current block) generated from the candidate mode, and the neighbouring reconstruction (i.e., the reconstructed samples within one or more neighbouring blocks) as shown in FIG. 21, where $pred_{i,j}$ refers to a predicted block, $reco_{i,j}$ refers to a neighbouring reconstructed block and block 2110 (as shown in a thick-line box) corresponds to the current block. Top boundary matching means the comparison between the current top predicted samples and the neighbouring top reconstructed samples, and left boundary matching means the comparison between the current left predicted samples and the neighbouring left reconstructed samples.

In another sub-embodiment, the candidate mode with the smallest boundary matching cost is applied to the current block.

In another sub-embodiment, regarding the enabling condition of the coding tool, the coding tool can be applied to the current block when the minimum boundary matching cost is smaller than a pre-defined threshold. For example, the pre-defined threshold is the boundary matching cost from the default mode (e.g. original mode, not refined with the proposed coding tool). When the cross-component prediction is used to refine the inter prediction, the default mode is the original inter mode which can be a regular, merge candidate, AMVP candidate, an affine candidate, a GPM candidate, or any one of merge candidates.

In another sub-embodiment,

If the minimum distortion for Cb is smaller than the pre-defined threshold, the candidate mode with the smallest distortion is used for Cb.

Otherwise, no candidate mode can be applied to Cb.

If the minimum distortion for Cr is smaller than the pre-defined threshold, the candidate mode with the smallest distortion is used for Cr.

Otherwise, no candidate mode can be applied to Cr

In another sub-embodiment, whether to apply any candidate mode to Cb and Cr is decided at the same time. (Take LM as an example. When LM is applied to Cb, LM is also applied to Cr.)

If the minimum distortion cross Cb and Cr is smaller than the pre-defined threshold, LM is applied to Cb and Cr.

Otherwise, LM is not applied to Cb and Cr.

If the minimum distortion for Cb or the minimum distortion for Cr is smaller than the pre-defined threshold, LM is applied to Cb and Cr.

Otherwise, LM is not applied to Cb and Cr.

In one embodiment, a pre-defined subset of the current prediction is used to calculate the boundary matching cost. n line(s) of top boundary within the current block and/or m line(s) of left boundary within the current block are used. (Moreover, n2 line(s) of top neighbouring reconstruction and/or m2 line(s) of left neighbouring reconstruction are used.)

In an example of calculating a boundary matching cost, n=2, m=2, n2=2, and m2=2:

$$\text{cost} = \sum_{x=o}^{block\ width}\left(\left|a*pred_{x,0} - b*pred_{x,1} - c*reco_{x,-1}\right| + \left|d*reco_{x,-1} - e*pred_{x,0} - f*reco_{x,-2}\right|\right) + \sum_{y=o}^{block\ height}\left(\left|g*pred_{0,y} - h*pred_{1,y} - i*reco_{-1,y}\right| + \left|j*reco_{-1,y} - k*pred_{0,y} - l*reco_{-2,y}\right|\right).$$

In the above equation, the weights (a, b, c, d, e, f, g, h, i, j, k, 1) can be any positive integers such as a=2, b=1, c=1, d=2, e=1, f=1, g=2, h=1, i=1, j=2, k=1, and 1=1.

In another example of calculating a boundary matching cost, n=2, m=2, n2=1 and m2=1:

$$\text{cost} = \sum_{x=o}^{block\ width}\left(\left|a*pred_{x,0} - b*pred_{x,1} - c*reco_{x,-1}\right|\right) + \sum_{y=o}^{block\ height}\left(\left|g*pred_{0,y} - h*pred_{1,y} - i*reco_{-1,y}\right|\right).$$

In the above equation, the weights (a, b, c, g, h, and i) can be any positive integers such as a=2, b=1, c=1, g=2, h=1, and i=1.

In yet another example of calculating a boundary matching cost, n=1, m=1, n2=2, and m2=2:

$$\text{cost} = \sum_{x=o}^{block\ width}\left(\left|a*reco_{x,-1} - e*pred_{x,0} - f*reco_{x,-2}\right|\right) + \sum_{y=o}^{block\ height}\left(\left|j*reco_{-1,y} - k*pred_{0,y} - l*reco_{-2,y}\right|\right).$$

In the above equation, the weights (d, e, f, j, k, and 1) can be any positive integers such as d=2, e=1, f=1, j=2, k=1, and 1=1.

In yet another example of calculating a boundary matching cost, n=1, m=1, n2=1, and m2=1:

$$\text{cost} = \sum_{x=o}^{block\ width}\left|a*pred_{x,0} - c*reco_{x,-1}\right| +$$

-continued $$\sum_{y=o}^{block\ height} |g * pred_{0,y} - i * reco_{-1,y}|.$$

In the above equation, the weights (a, c, g, and i) can be any positive integers such as a=1, c=1, g=1, and i=1.

In yet another example of calculating a boundary matching cost, n=2, m=1, n2=2, and m2=1:

$$\text{cost} = \sum_{x=o}^{block\ width} (|a * pred_{x,0} - b * pred_{x,1} - c * reco_{x,-1}| + |d * reco_{x,-1} - e * pred_{x,0} - f * reco_{x,-2}|) + \sum_{y=o}^{block\ height} (|g * pred_{0,y} - i * reco_{-1,y}|).$$

In the above equation, the weights (a, b, c, d, e, f, g, and i) can be any positive integers such as a=2, b=1, c=1, d=2, e=1, f=1, g=1, and i=1.

In yet another example of calculating a boundary matching cost, n=1, m=2, n2=1, and m2=2:

$$\text{cost} = \sum_{x=o}^{block\ width} (|a * pred_{x,0} - c * reco_{x,-1}|) + \sum_{y=o}^{block\ height} (|g * pred_{0,y} - h * pred_{1,y} - i * reco_{-1,y}| + |j * reco_{-1,y} - k * pred_{0,y} - l * reco_{-2,y}|).$$

In the above equation, the weights (a, c, g, h, i, j, k, and 1) can be any positive integers such as a=1, c=1, g=2, h=1, i=1, j=2, k=1, and 1=1.

(The following examples for n and m can also be applied to n2 and m2.)

For another example, n can be any positive integer such as 1, 2, 3, 4, etc.

For another example, m can be any positive integer such as 1, 2, 3, 4, etc.

For another example, n and/or m vary with block width, height, or area. In one embodiment, m gets larger for a larger block (e.g. area>threshold2). For example, Threshold2=64, 128, or 256.

When area>threshold2, m is increased to 2. (Originally, m is 1.)

When area>threshold2, m is increased to 4. (Originally, m is 1 or 2.)

In another example, m gets larger and/or n gets smaller for a taller block (e.g. height>thrershold2*width). For example, Threshold2=1, 2, or 4.

When height>threshold2*width, m is increased to 2. (Originally, m is 1.)

When height>threshold2*width, m is increased to 4. (Originally, m is 1 or 2.)

In another embodiment, n gets larger for a larger block (area>threshold2).

Threshold2=64, 128, or 256.

When area>threshold2, n is increased to 2. (Originally, n is 1.)

When area>threshold2, n is increased to 4. (Originally, n is 1 or 2.)

In another embodiment, n gets larger and/or m gets smaller for a wider block (width>threshold2*height). For example, Threshold2=1, 2, or 4.

When width>threshold2*height, n is increased to 2. (Originally, n is 1.)

When width>threshold2*height, n is increased to 4. (Originally, n is 1 or 2.)

As described in the above boundary-matching based method, the cost for each prediction model of the candidate set corresponds to a boundary matching cost measuring discontinuity between predicted samples of the second-colour block and neighbouring reconstructed samples of the second-colour block. The predicted samples of the second-colour block are derived based on the first-colour block using the set of model parameters determined for each prediction model. For example, the first-colour can be the luma signal and the second-colour can be one of the chroma components or both. In another example, the first-colour can be one (e.g. Cb/Cr) of the chroma components and the second-colour can be another (e.g. Cr/Cb) of the chroma components. The set of model parameters may comprise alpha and beta. The candidate set may comprise some modes selected from CCLM_TL, CCLM_T, CCLM_L, MMLM_TL, MMLM_T and MMLM_L. An example of the boundary is shown in FIG. 21. However, the boundary may comprise the top boundary only, the left boundary only or both the top and the left boundaries. In another example, the boundary selection may depend on the coding mode information for the current block or the candidate types of the candidates in the candidate set.

Model-Accuracy Setting

Figure 22:
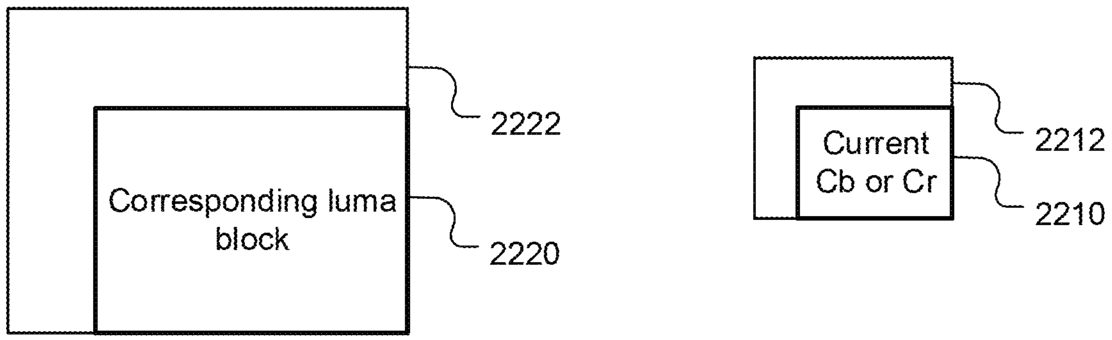
FIG. 22 illustrates an example of the templates for luma and chroma to derive the model parameters and the template-matching distortion.

Step 0: When model-accuracy setting is used, the model parameters for each candidate mode are performed on the template (i.e., neighbouring region) of the current block. FIG. 22 illustrates an example of the templates for luma and chroma to derive the model parameters and the distortion. In FIG. 22, block 2210 represents a current chroma block (Cb or Cr) and block 2220 represents a corresponding luma block. Area 2212 corresponds to the chroma template. Area 2222 corresponds to the luma template. Take LM family as an example.

Different model parameters are derived by the different LM modes.

Apply each LM mode by using neighbouring reconstructed luma samples and neighbouring reconstructed chroma samples to get the model parameters (i.e., alpha and beta).

Then, the model parameters derived for individual candidate modes may include:

$alphac_{CLM\_LT\_cb}$, $betac_{CLM\_LT\_cb}$, $alphac_{CLM\_LT\_cr}$, $betac_{CLM\_LT\_cr}$ $alphac_{CLM\_L\_cb}$, $betac_{CLM\_L\_cb}$, $alphac_{CLM\_L\_cr}$, $betac_{CLM\_L\_cr}$ $alphac_{CLM\_T\_cb}$, $betac_{CLM\_T\_cb}$, $alphac_{CLM\_T\_cr}$, $betac_{CLM\_T\_cr}$ $alpha_{MMLM\_LT\_cb}$, $beta_{MMLM\_LT\_cb}$, $alpha_{MMLM\_LT\_cr}$, $beta_{MMLM\_LT\_cr}$ $alpha_{MMLM\_L\_cb}$, $beta_{MMLM\_L\_cb}$, $alpha_{MMLM\_L\_cr}$, $beta_{MMLM\_L\_cr}$ $alpha_{MMLM\_T\_cb}$, $beta_{MMLM\_T\_cb}$, $alpha_{MMLM\_T\_cr}$, $beta_{MMLM\_T\_cr}$ Step 1: Take the reconstructed samples of the template of current block as the golden data.

Step 2: For each candidate mode, apply the derived model parameters to the reconstructed/predicted samples within the template of corresponding luma block to get the predicted samples within the template of the current chroma block Step 3: For each candidate mode, calculate the distortion between the golden data and the predicted samples on the template.

There are various ways to calculate the distortion in Step 3. In one embodiment, the template used in the distortion calculation is the template used for model parameter derivation. In another embodiment, the template selection may depend on the coding mode information for the current block or the candidate types of the candidates in the candidate set.

For example, for CCLM_LT/MMLM_LT, the template used in the distortion calculation is the template including left and top templates.

In another example, for CCLM_L/MMLM_L, the template used in the distortion calculation is the template including left template.

In another example, for CCLM_T/MMLM_T, the template used in the distortion calculation is the template including top template.

In another embodiment, the template used in the distortion calculation is the template including left and top templates.

Step 4: Decide the mode for the current block according to the calculated distortions.

In another sub-embodiment, the candidate mode with the smallest distortion is used for the current block.

In another sub-embodiment, regarding the enabling condition of the coding tool, the coding tool can be applied to the current block when the minimum distortion is smaller than a pre-defined threshold.

For example, the pre-defined threshold is T*template area.

T can be any floating value or 1/N (N can be any positive integer).

Template area is set as template width*the current block height+template height*the current block width.

For example, the pre-defined threshold is the distortion between the reconstructed samples of the template for the current block and the predicted samples of the template generated from the default mode. When the cross-component prediction is used to refine the inter prediction, the default mode is the original inter mode which can be a regular, merge candidate, AMVP candidate, an affine candidate, an GPM candidate, or any one of merge candidate.

In another sub-embodiment,

If the minimum distortion for Cb is smaller than the pre-defined threshold, the candidate mode with the smallest distortion is used for Cb.

Otherwise, no candidate mode can be applied to Cb.

If the minimum distortion for Cr is smaller than the pre-defined threshold, the candidate mode with the smallest distortion is used for Cr.

Otherwise, no candidate mode can be applied to Cr

In another sub-embodiment, whether to apply any candidate mode to Cb and Cr is decided at the same time. (Take LM as an example. When LM is applied to Cb, LM is also applied to cr.)

If the minimum distortion for Cb and the minimum distortion for Cr are smaller than the pre-defined threshold, LM is applied to Cb and Cr.

Otherwise, LM is not applied to Cb and Cr.

If the minimum distortion for Cb or the minimum distortion for Cr is smaller than the pre-defined threshold, LM is applied to Cb and Cr.

Otherwise, LM is not applied to Cb and Cr.

As described in the above model-accuracy based method, a second-colour template comprising selected neighbouring samples of the second-colour block and a first-colour template comprising corresponding neighbouring samples of the first-colour block are determined. For example, the first-colour can be the luma signal and the second-colour can be one of the chroma components or both. In another example, the first-colour can be one (e.g. Cb/Cr) of the chroma components and the second-colour can be another (e.g. Cr/Cb) of the chroma components. A set of model parameters are determined for each prediction model of the candidate set based on the second-colour template and the first-colour template, and wherein the cost for said each prediction model of the candidate set is determined between reconstructed samples and predicted samples of the second-colour template. The predicted samples of the second-colour template are derived by applying said one or more model parameters determined for each prediction model to the first-colour template.

The proposed methods in this invention can be enabled and/or disabled according to implicit rules (e.g. block width, height, or area) or according to explicit rules (e.g. syntax in block, tile, slice, picture, SPS (Sequence Parameter Set), or PPS (Picture Parameter Set) level). For example, the proposed methods are applied when the block width, height, and/or area is smaller than a threshold. For example, the proposed methods are applied when the block width, height, and/or area is larger than a threshold.

The term "block" in this invention can refer to TU/TB, CU/CB, PU/PB, pre-defined region, or CTU/CTB. The following is an example of the current block referring to a CU. In single tree splitting, the current block refers to a CU containing Y, Cb, and Cr. When the proposed methods are used for chroma components to improve prediction, the corresponding luma component may keep unchanged. That is, if the current CU is mode type inter or IBC, the luma component still employs motion compensation or intra block copy scheme to generate the luma prediction. In dual tree splitting, for luma dual tree, a luma CU contains Y and for chroma dual tree, the current block refers to a chroma CU containing Cb and Cr.

The term "LM" in this invention can be viewed as one kind of CCLM/MMLM modes or any other extension/variation of CCLM (e.g. the proposed CCLM extension/variation in this invention).

The proposed methods (for CCLM) in this invention can be used for any other LM modes.

Any combination of the proposed methods in this invention can be applied.

Figure 1B:
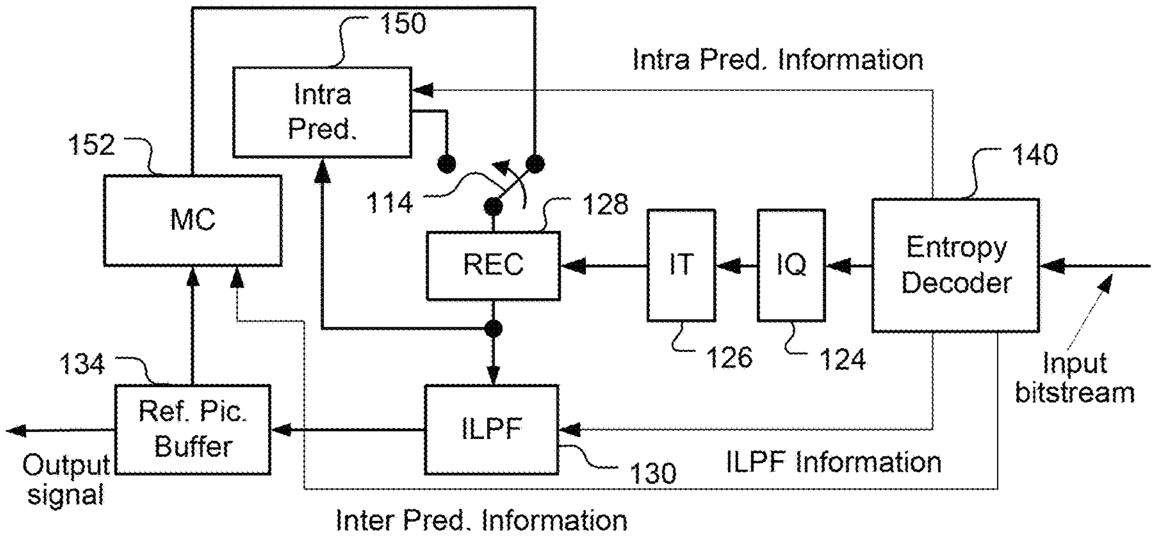
Fig. 1B (Prior Art)
FIG. 1B illustrates a corresponding decoder for the encoder in FIG. 1A.

Any of the foregoing proposed implicit cross-component prediction methods for coding tool using blended predictors can be implemented in encoders and/or decoders. For example, the blended predictors correspond to two cross-component intra or inter predictors, which can be implemented in an inter/intra/prediction module of an encoder, and/or an inter/intra/prediction module of a decoder. For example, in the encoder side, the required processing can be implemented as part of the Inter-Pred. unit 112 or Intra Pred. unit 110 as shown in FIG. 1A. However, the encoder may also use additional processing unit to implement the required processing. For the decoder side, the required processing can be implemented as part of the MC unit 152 or Intra Pred. 150 as shown in FIG. 1B. However, the decoder may also use additional processing unit to implement the required processing. Alternatively, any of the proposed methods can be implemented as a circuit coupled to the inter/intra/prediction module of the encoder and/or the inter/intra/prediction module of the decoder, so as to provide the information needed by the inter/intra/prediction module. While the Inter-Pred. 112 and Intra Pred. 110 in the encoder side and MC 152 and Intra Pred. 150 in the decoder side are shown as individual processing units, they may correspond to executable software or firmware codes stored on a media, such as hard disk or flash memory, for a CPU (Central Processing Unit) or programmable devices (e.g. DSP (Digital Signal Processor) or FPGA (Field Programmable Gate Array)).

Figure 23:
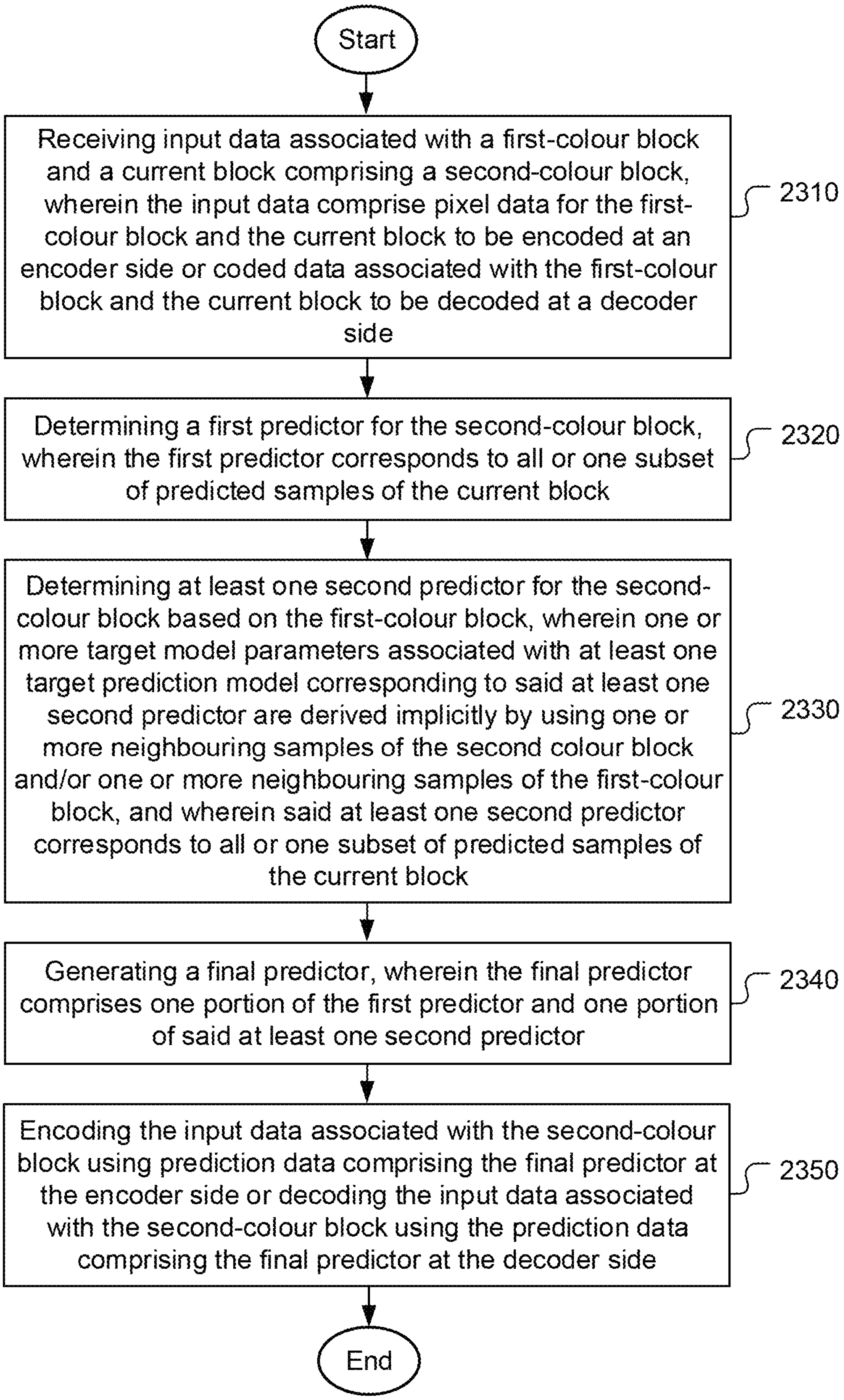
FIG. 23 illustrates a flowchart of an exemplary video coding system that utilizes blended predictors according to an embodiment of the present invention.

FIG. 23 illustrates a flowchart of an exemplary video coding system that utilizes blended predictors according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current block comprising a first-colour block and a second-colour block are received in step 2310, wherein the input data comprise pixel data for the current block to be encoded at an encoder side or coded data associated with the current block to be decoded at a decoder side are received. A first predictor for the second-colour block is determined in step 2320, where the first predictor corresponds to all or one subset of predicted samples of the current block. At least one second predictor is determined for the second-colour block based on the first-colour block in step 2330, where one or more target model parameters associated with at least one target prediction model corresponding to said at least one second predictor are derived implicitly by using one or more neighbouring samples of the second colour block and/or one or more neighbouring samples of the first-colour block, and where said at least one second predictor corresponds to all or one subset of predicted samples of the current block. A final predictor is generated in step 2340, where the final predictor comprises one portion of the first predictor and one portion of said at least one second predictor. The input data associated with the second-colour block is encoded or decoded using prediction data comprising the final predictor in step 2350.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding for colour pictures, the method comprising:

receiving input data associated with a first-colour block and a current block comprising a second-colour block, wherein the input data comprise pixel data for the first-colour block and the current block to be encoded at an encoder side or coded data associated with the first-colour block and the current block to be decoded at a decoder side;

determining a first predictor for the second-colour block, wherein the first predictor corresponds to all or one subset of predicted samples of the current block;

determining at least one second predictor for the second-colour block based on the first-colour block, wherein one or more target model parameters associated with at least one target prediction model corresponding to said at least one second predictor are derived implicitly by using one or more neighbouring samples of the second-colour block and one or more neighbouring samples of the first-colour block, and wherein said at least one second predictor corresponds to all or one subset of predicted samples of the current block;

generating a final predictor, wherein the final predictor comprises one portion of the first predictor and one portion of said at least one second predictor; and encoding the input data associated with the second-colour block using prediction data comprising the final predictor at the encoder side or decoding the input data associated with the second-colour block using the prediction data comprising the final predictor at the decoder side.

2. The method of claim 1, wherein the first predictor corresponds to an intra predictor.

3. The method of claim 1, wherein the first predictor corresponds to a type of cross-colour predictor.

4. The method of claim 3, wherein the first predictor is generated based on CCLM_LT, CCLM_L, or CCLM_T.

5. The method of claim 1, wherein said at least one second predictor is generated based on MMLM (Multiple Model CCLM (Cross Component Linear Model)) mode.

6. The method of claim 1, wherein said one portion of the first predictor is derived based on the first predictor with a first weight and said one portion of said at least one second predictor is derived based on said at least one second predictor with at least one second weight.

7. The method of claim 6, wherein the final predictor is derived as a sum of said one portion of the first predictor and said one portion of said at least one second predictor.

8. The method of claim 6, wherein the first weight, said at least one second weight, or both are determined for individual samples of the second-colour block.

9. The method of claim 1, wherein a syntax is signalled at the encoder side to indicate whether to allow said determining said at least one second predictor, said generating the final predictor, and said encoding or decoding the current block using the prediction data comprising the final predictor.

10. The method of claim 9, wherein the syntax is signalled at the encoder side or parsed at the decoder side in a block level, tile level, slice level, picture level, SPS (Sequence Parameter Set) level, or PPS (Picture Parameter Set) level.

11. The method of claim 9, wherein the syntax indicates to allow said determining said at least one second predictor, said generating the final predictor, and said encoding or decoding the current block using the prediction data comprising the final predictor if the current block uses a pre-defined cross-colour mode.

12. The method of claim 11, wherein the pre-defined cross-colour mode corresponds to CCLM_LT mode, CCLM_L mode, or CCLM_T mode.

13. The method of claim 1, wherein whether to allow said determining said at least one second predictor, said generating the final predictor, and said encoding or decoding the current block using the prediction data comprising the final predictor is determined implicitly.

14. The method of claim 1, wherein one or more model parameters are determined for each prediction model of a candidate set and a cost is evaluated for said each prediction model of the candidate set, and wherein one prediction model of the candidate set achieving a minimum cost is selected as said at least one target prediction model and said one or more model parameters associated with said one prediction model of the candidate set achieving the minimum cost are selected as said one or more target model parameters.

15. The method of claim 14, wherein said determining said at least one second predictor, said generating the final predictor, and said encoding or decoding the current block using the prediction data comprising the final predictor are allowed if the minimum cost is below a threshold.

16. The method of claim 15, wherein the threshold depends on block size of the current block, sequence resolution, neighbouring blocks, QP (quantization parameter), or any combination thereof.

17. The method of claim 14, wherein a second-colour template comprising selected neighbouring samples of the second-colour block and a first-colour template comprising corresponding neighbouring samples of the first-colour block are determined, said one or more model parameters are determined for said each prediction model of the candidate set based on reference samples of the first-colour template and reference samples of the second-colour template, and wherein the cost for said each prediction model of the candidate set is determined between reconstructed samples and predicted samples of the second-colour template, and the predicted samples of the second-colour template are derived by applying said one or more model parameters determined for said each prediction model to the first-colour template.

18. The method of claim 17, wherein the second-colour template comprises top neighbouring samples, left neighbouring samples, or both of the second-colour block, and the first-colour template comprises top neighbouring samples of the second-colour block, left neighbouring samples of the second-colour block, or both of the first-colour block.

19. The method of claim 17, wherein the current block comprises a Cr block and a Cb block, and the first-colour block corresponds to a Y block and the second-colour block corresponds to the Cr block or the Cb block, and wherein when a syntax indicates that said determining said at least one second predictor, said generating the final predictor, and said encoding or decoding the current block using the prediction data comprising the final predictor are allowed for one of the Cr block and the Cb block, then said determining said at least one second predictor, said generating the final predictor, and said encoding or decoding the current block using the prediction data comprising the final predictor are also allowed for the other of the Cr block and the Cb block.

20. The method of claim 14, wherein the cost for said each prediction model of the candidate set corresponds to a boundary matching cost measuring discontinuity between predicted samples of the second-colour block and neighbouring reconstructed samples of the second-colour block, and wherein the predicted samples of the second-colour block are derived based on the first-colour block using said one or more model parameters determined for said each prediction model.

21. The method of claim 20, wherein the boundary matching cost comprises a top boundary matching cost comparing between top predicted samples of the second-colour block and neighboring top reconstructed samples of the second-colour block, a left boundary matching cost comparing between left predicted samples of the second-colour block and neighboring left reconstructed samples of the second-colour block, or both.

22. The method of claim 14, wherein a second-colour template comprising selected neighbouring samples of the second-colour block and a first-colour template comprising corresponding neighbouring samples of the first-colour block are determined, said one or more model parameters are determined for said each prediction model of the candidate set based on the second-colour template and the first-colour template, and wherein the cost for said each prediction model of the candidate set is determined between reconstructed samples and predicted samples of the second-colour template, and the predicted samples of the second-colour template are derived by applying said one or more model parameters determined for said each prediction model to the first-colour template.

23. An apparatus for video coding, the apparatus comprising one or more electronics or processors arranged to:

receive input data associated with a first-colour block and a current block comprising a second-colour block, wherein the input data comprise pixel data for the first-colour block and the current block to be encoded at an encoder side or coded data associated with the first-colour block and the current block to be decoded at a decoder side;

determine a first predictor for the second-colour block, wherein the first predictor corresponds to all or one subset of predicted samples of the current block;

determine at least one second predictor for the second-colour block based on the first-colour block, wherein one or more target model parameters associated with at least one target prediction model corresponding to said at least one second predictor are derived implicitly by using one or more neighbouring samples of the second-colour block and one or more neighbouring samples of the first-colour block, and wherein said at least one second predictor corresponds to all or one subset of predicted samples of the current block;

generate a final predictor, wherein the final predictor comprises one portion of the first predictor and one portion of said at least one second predictor; and encode the input data associated with the second-colour block using prediction data comprising the final predictor at the encoder side or decode the input data associated with the second-colour block using the prediction data comprising the final predictor at the decoder side.

* * * * *